(12) United States Patent
Rapaz

(10) Patent No.: US 7,914,228 B2
(45) Date of Patent: Mar. 29, 2011

(54) MULTI-PURPOSE CONSTRUCTION MODULE

(76) Inventor: Antonio Rapaz, Chilliwack (CA)

(*) Notice: Subject to any disclaimer, the term of this patent is extended or adjusted under 35 U.S.C. 154(b) by 597 days.

(21) Appl. No.: 11/689,409

(22) Filed: Mar. 21, 2007

(65) Prior Publication Data

US 2007/0266669 A1    Nov. 22, 2007

Related U.S. Application Data

(63) Continuation-in-part of application No. 11/434,815, filed on May 17, 2006.

(51) Int. Cl.
*E01C 5/00* (2006.01)
(52) U.S. Cl. .............................. 404/34; 404/40; 404/41
(58) Field of Classification Search .................. 404/28, 404/30, 34, 35, 40, 41, 43
See application file for complete search history.

(56) References Cited

U.S. PATENT DOCUMENTS

| | | | |
|---|---|---|---|
| 3,886,706 A | 6/1975 | Baker | |
| 4,012,882 A | 3/1977 | Juriss et al. | |
| 4,436,779 A * | 3/1984 | Menconi et al. | 428/169 |
| 4,577,448 A * | 3/1986 | Howorth | 52/584.1 |
| 4,875,800 A * | 10/1989 | Hicks | 404/35 |
| 5,118,547 A * | 6/1992 | Chen | 428/44 |
| 5,406,745 A * | 4/1995 | Lin | 47/1.01 F |
| 5,411,782 A | 5/1995 | Jarvis et al. | |
| 5,471,806 A | 12/1995 | Rokhlin | |
| 5,816,738 A * | 10/1998 | Harnapp | 404/18 |
| 5,971,655 A * | 10/1999 | Shirakawa | 404/40 |
| 6,511,257 B1 * | 1/2003 | Seaux et al. | 404/34 |
| 6,688,808 B2 * | 2/2004 | Lee | 404/40 |
| 7,299,592 B2 * | 11/2007 | Moller, Jr. | 52/180 |
| 7,303,800 B2 * | 12/2007 | Rogers | 428/44 |
| 7,344,334 B2 * | 3/2008 | Thorkelson | 404/29 |
| 2005/0204695 A1 | 9/2005 | Blazevic | |
| 2007/0266667 A1 * | 11/2007 | Rapaz | 52/585.1 |

FOREIGN PATENT DOCUMENTS

EP          1400638 A1       3/2004
* cited by examiner

*Primary Examiner* — Gary S Hartmann
(74) *Attorney, Agent, or Firm* — Oyen Wiggs Green & Mutala LLP

(57) ABSTRACT

This application relates to a light-weight, multi-purpose construction module. The module may be used, for example, as a mold for settable materials such as concrete. A plurality of modules may be aligned together in different configurations for use as a temporary road or support for use on unstable terrain, such as arctic tundra or wetlands. In yet another application the module may be deployed as a storage or shelving unit. The module comprises a deck and a plurality of wall elements projecting from the deck and defining a plurality of honeycomb-like compartments. The module may be used in conjunction with a mating cover for enclosing the module compartments. In one embodiment the cover may be coupled to the module in two different orientations. In one of the orientations connectors may be coupled to an outer surface of the cover. The connectors are useful for joining separate modules together and for providing the assembly with enhanced structural integrity, for example to support heavy loads. In one embodiment heated water or other fluid may be circulated through the modules to regulate the temperature of construction panels formed from the modules, such as flooring or roofing panels.

26 Claims, 39 Drawing Sheets

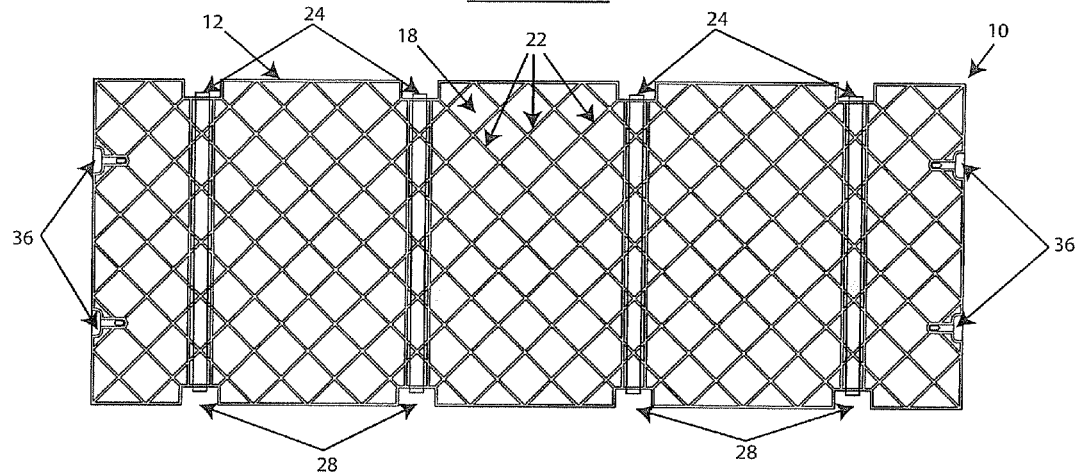
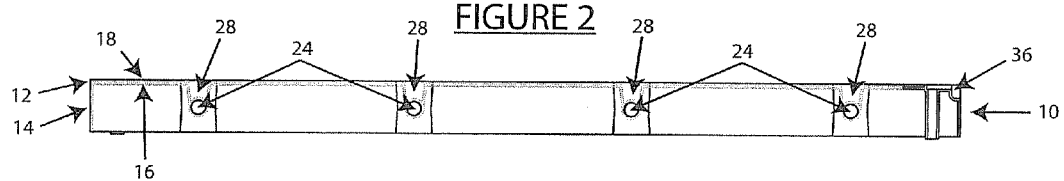
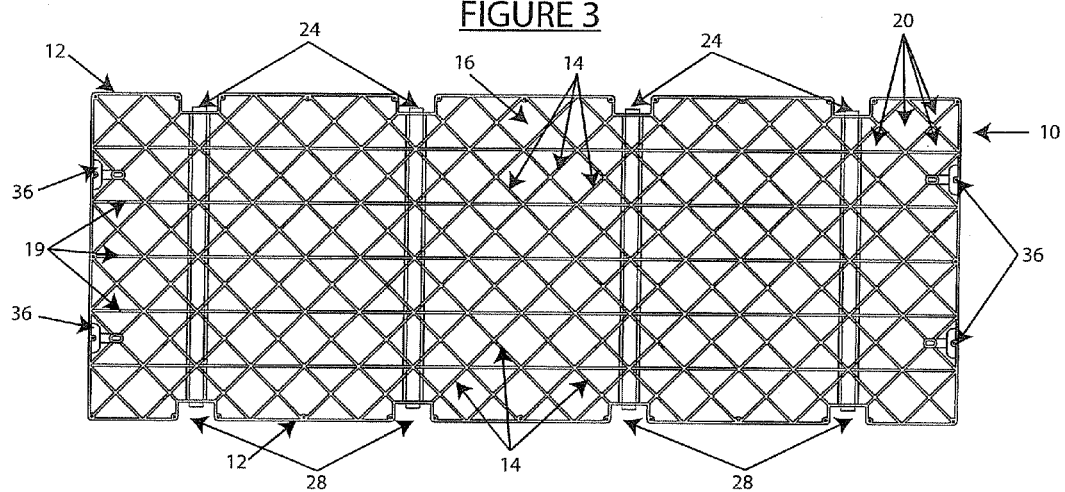

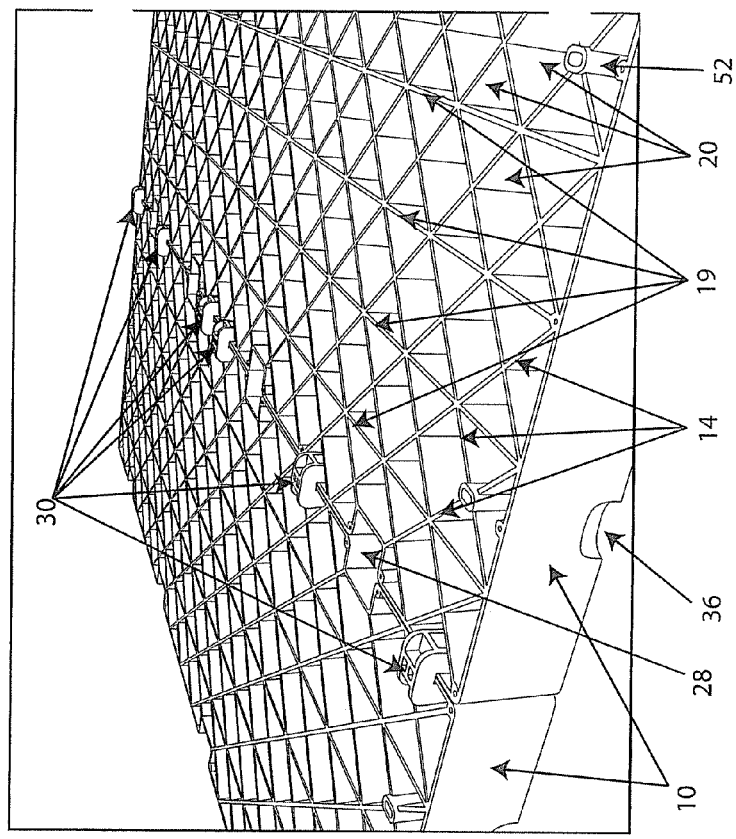
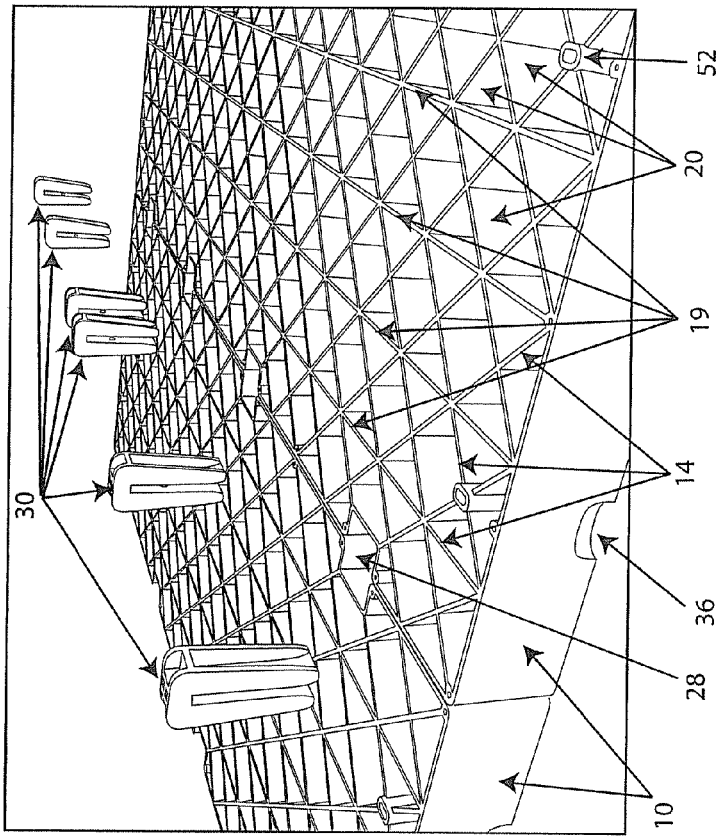

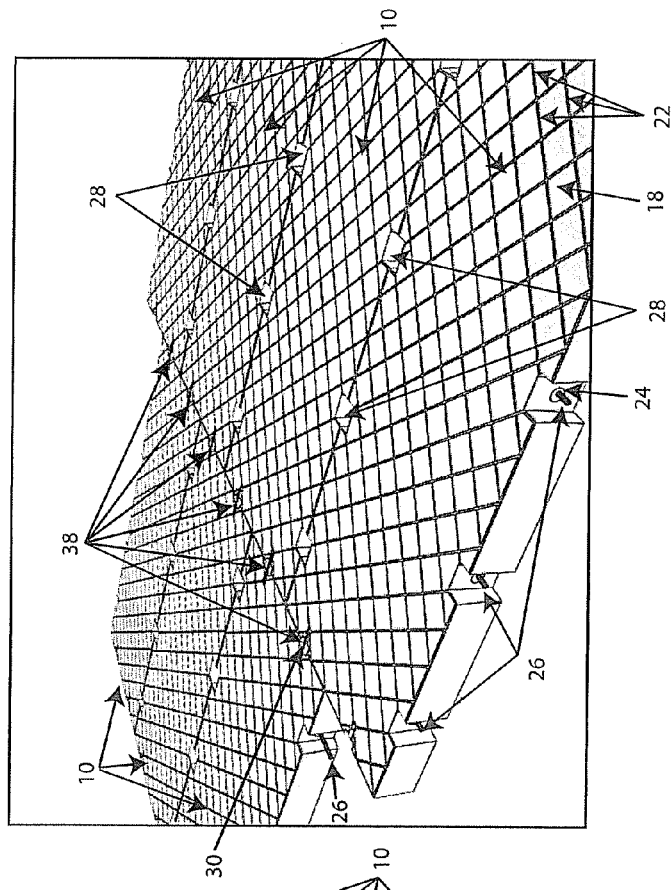
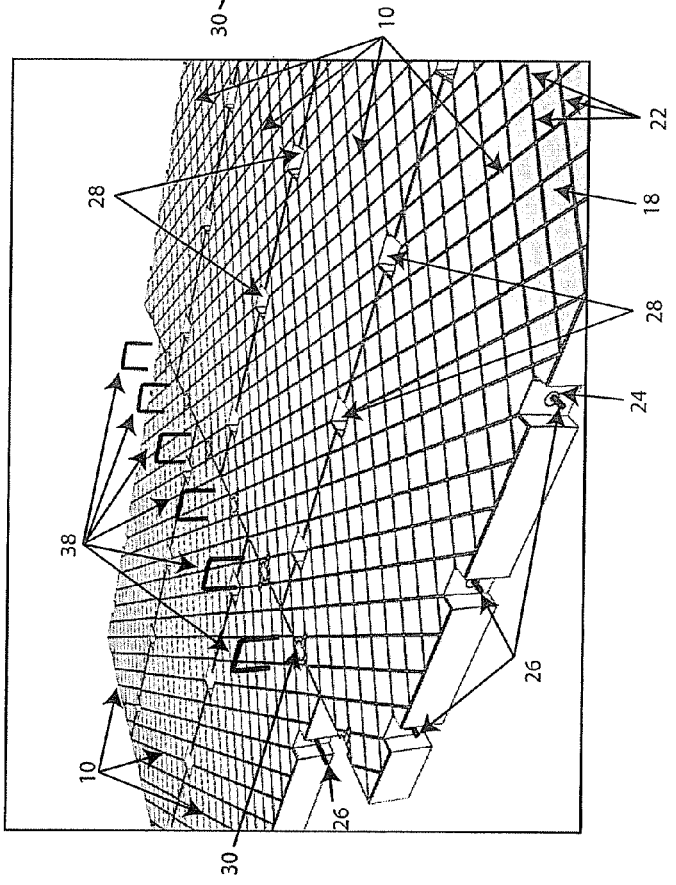

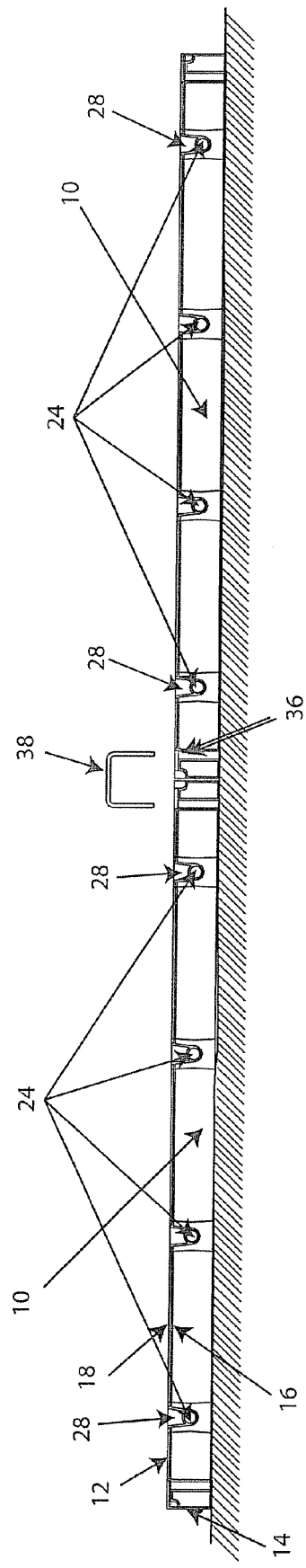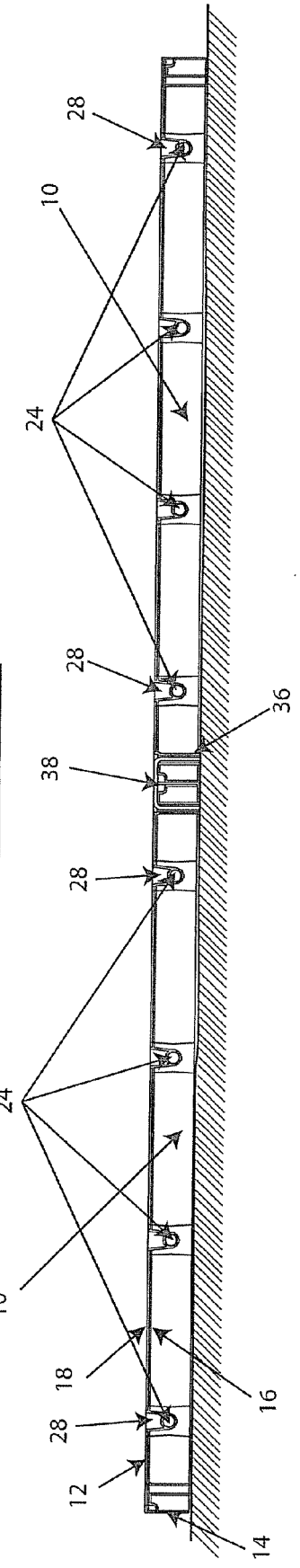

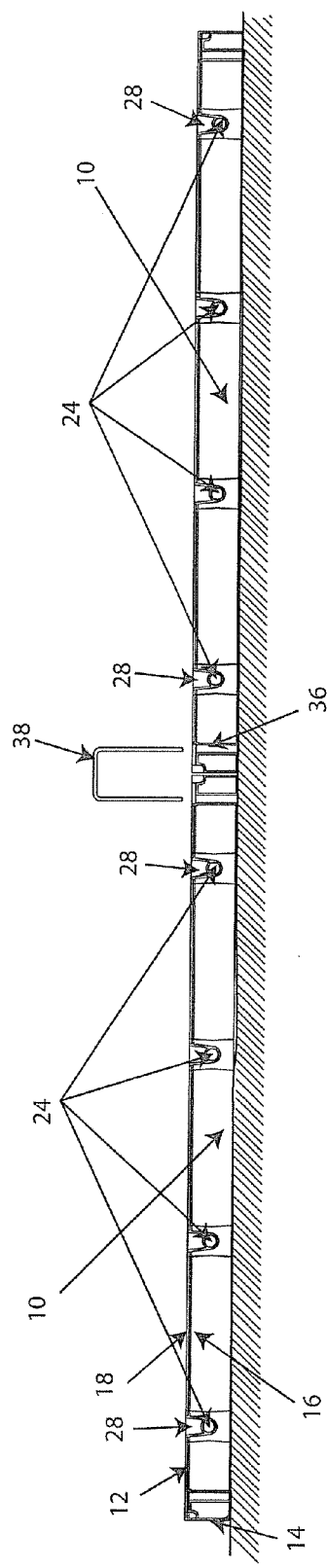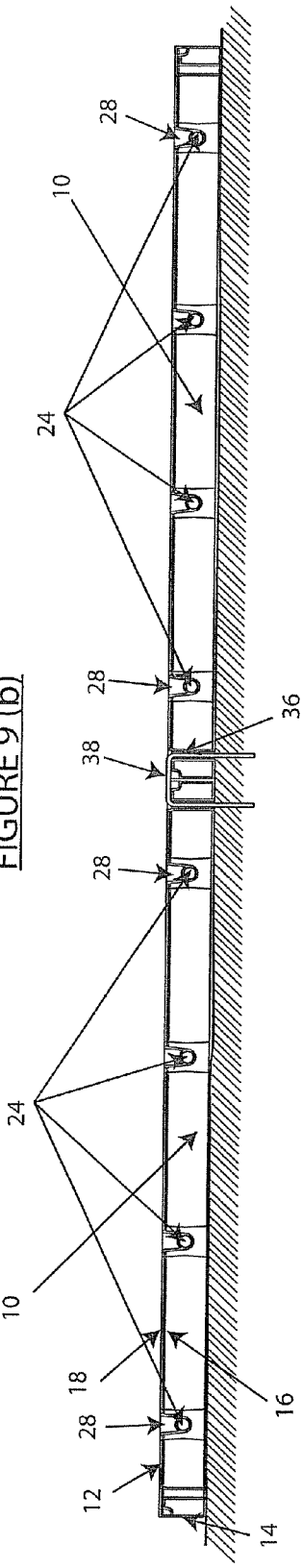

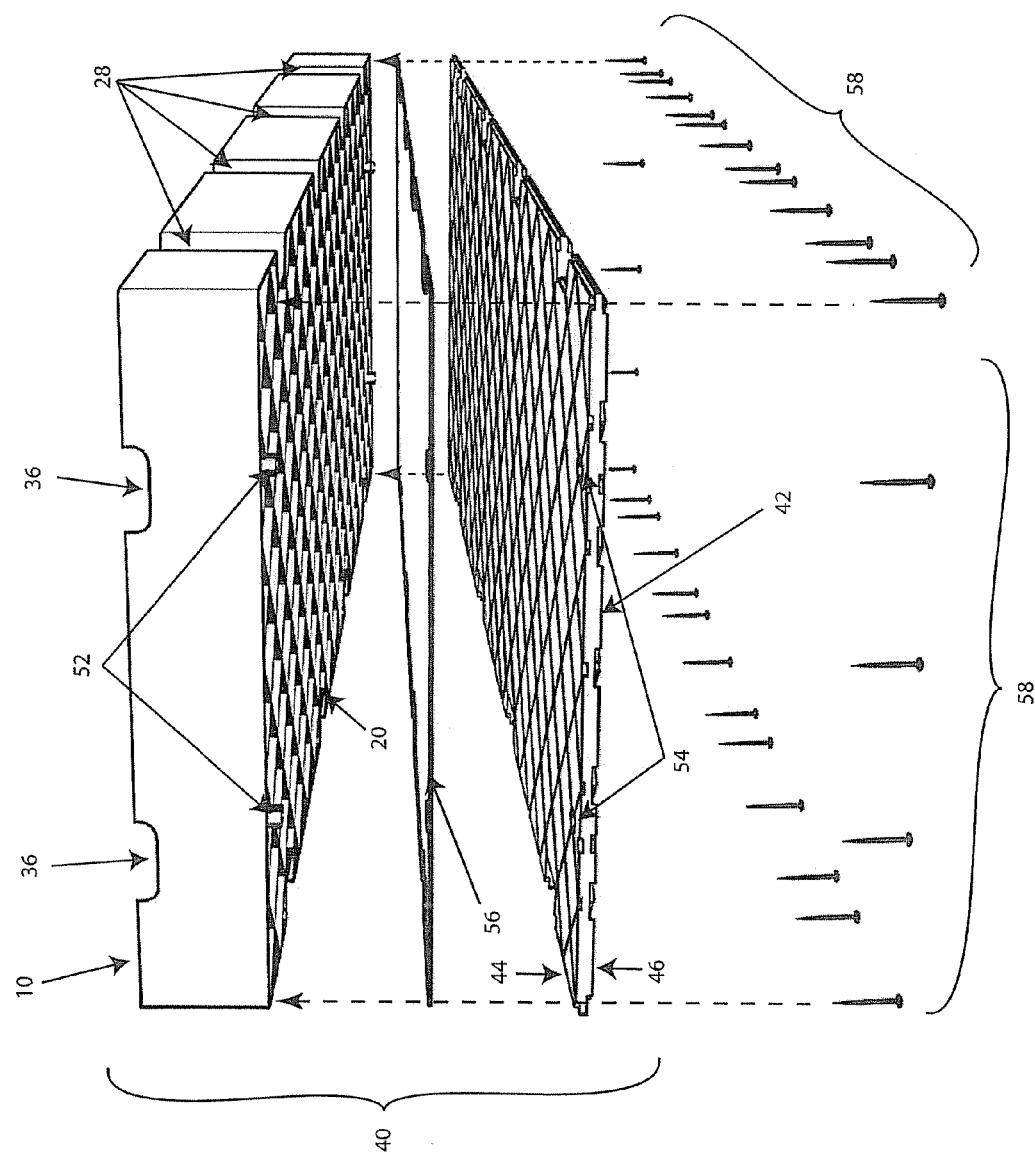

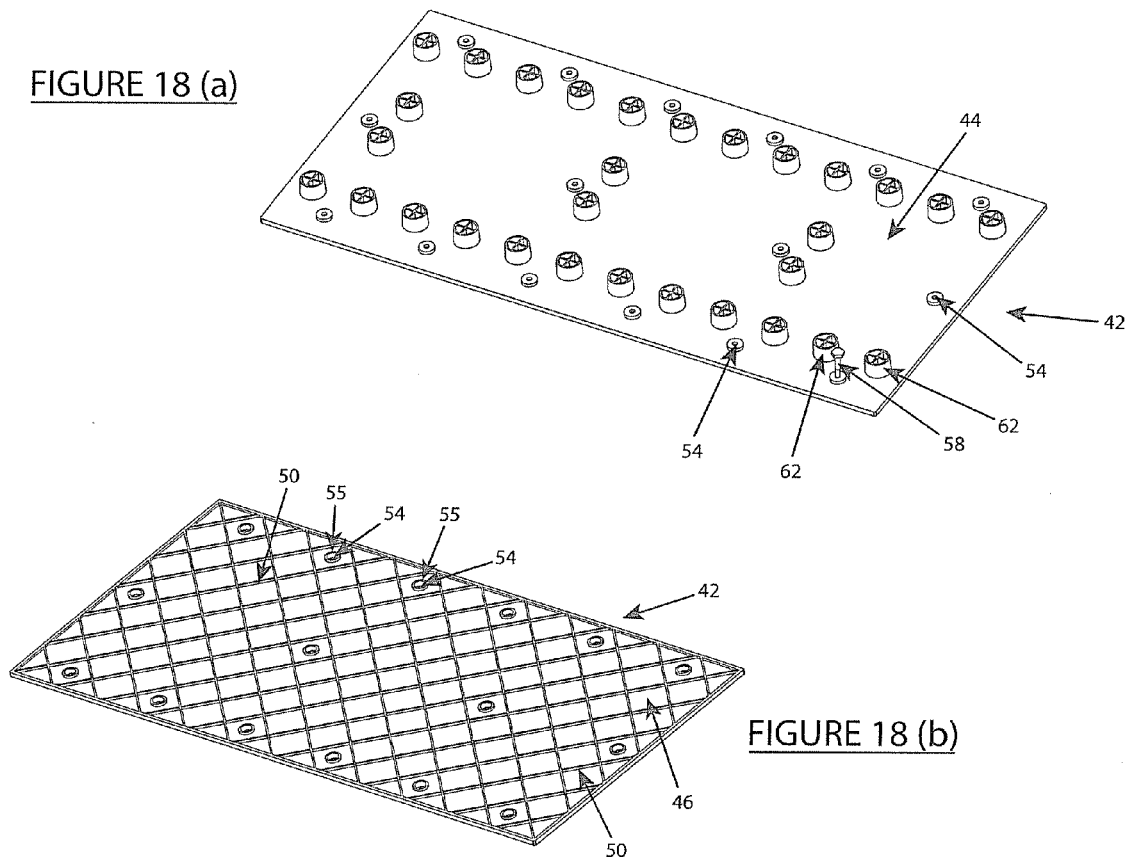
FIGURE 18 (a)
FIGURE 18 (b)
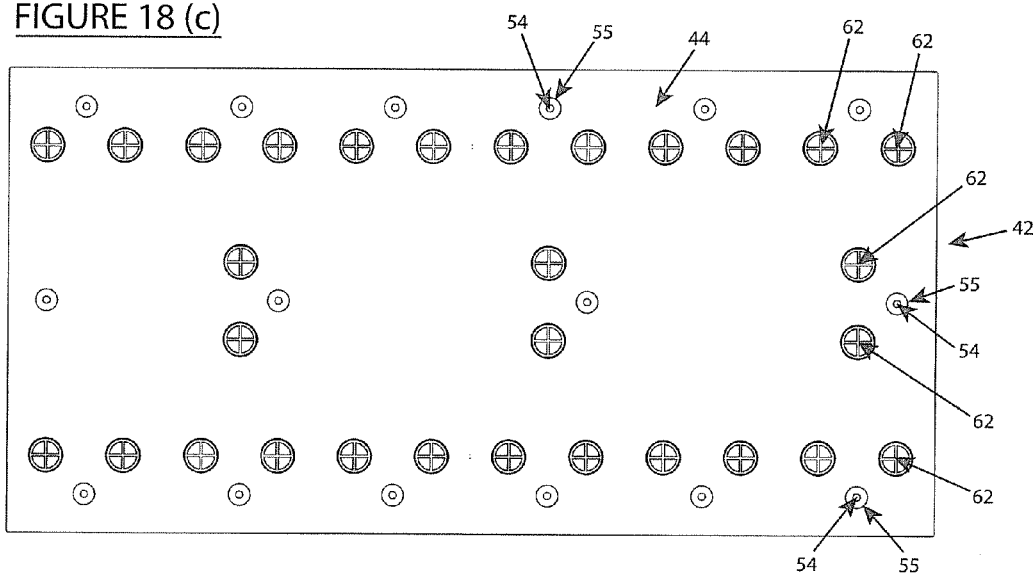
FIGURE 18 (c)

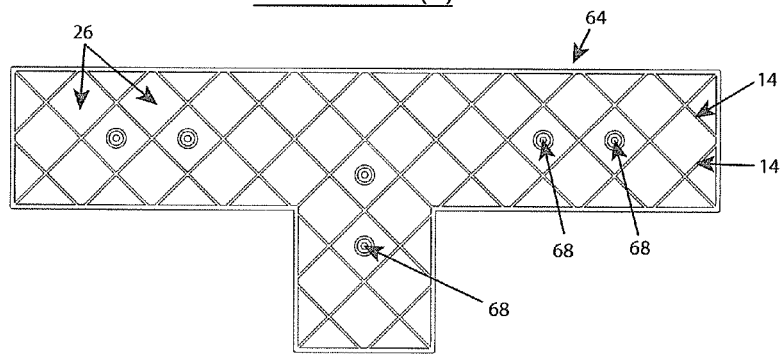
FIGURE 21 (a)
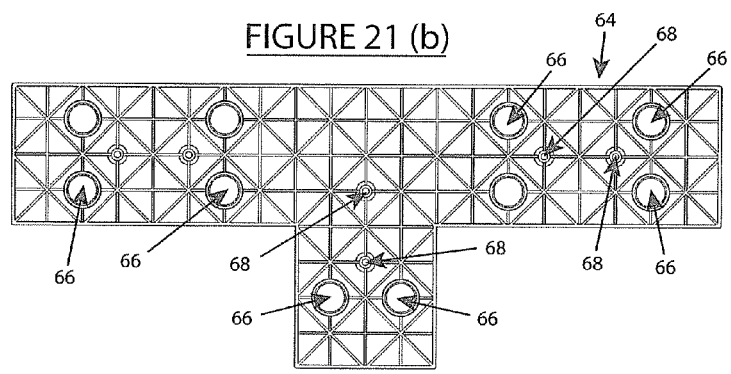
FIGURE 21 (b)
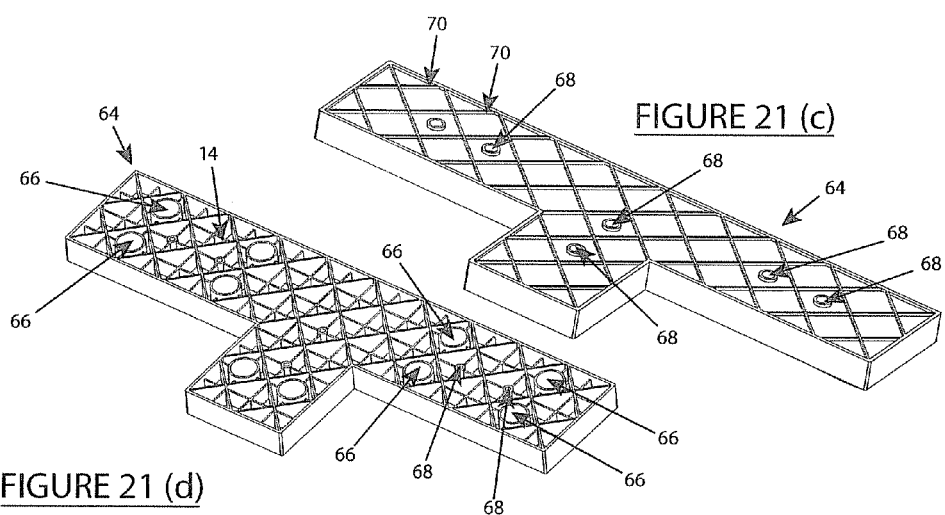
FIGURE 21 (c)
FIGURE 21 (d)

MULTI-PURPOSE CONSTRUCTION MODULE

RELATED APPLICATION

This application is a continuation-in-part of pending application Ser. No. 11/434,815 filed 17 May 2006.

TECHNICAL FIELD

This application relates to a multi-purpose construction module.

BACKGROUND

Construction forms for containing concrete or other settable materials are typically fabricated on-site. After the concrete is poured and set, the forms are removed. These steps are relatively time-consuming and labour-intensive. Moreover, since the forms are not designed to be left in place, they do not enhance the structural integrity or strength of the poured concrete or other material. While the use of metal reinforcing bars and ribs is known for stabilizing and strengthening concrete, there is a need for more light-weight and inexpensive construction solutions.

Another application where pre-formed construction modules may be used is to build temporary roads or work pads. This is particularly important in regions having unstable ground support, such as arctic tundra during seasons when the ground is not frozen. Another example of unstable ground support is in wetlands such as swamps or everglades systems. The unstable ground makes it very difficult to deploy or move heavy equipment, such as oil drilling or exploration machinery, at certain times of the year. This problem is conventionally addressed by laying down a large number of wood mats on the unstable ground to distribute the machinery weight over a larger surface area. One problem with this approach is that protruding nails used to maintain the wood mats together frequently puncture vehicle tires.

Interlocking mat systems made from high density polyethylene are known in the prior art for construction of temporary roads or other support surfaces. However, such mats are relatively heavy and require cranes or other specialized equipment to install or remove the mats. The need has arisen for more light-weight and economical construction modules which may be quickly and reliably deployed at remote locations.

SUMMARY OF INVENTION

In accordance with the invention, a construction module comprising a planar deck and a plurality of wall elements projecting from the deck is provided. The wall elements define a plurality of compartments, each of said compartments having a closed end defined by a portion of the deck and an open end remote from the deck. In one embodiment at least some of the wall elements define a plurality of parallel, spaced-apart partitions extending longitudinally on the deck. The deck may be a sheet having a first side and a second side, wherein the wall elements project from the first side in a plane generally perpendicular to the plane of the sheet. A plurality of ribs may project from the second side of the sheet. The module may be economically formed from cast plastic or other light-weight material.

In one embodiment of the invention the module may include a plurality of conduits, such as cylindrical pipes, extending transversely through the module at spaced-apart intervals for threading cable connectors therethrough. The connectors may be used for quickly aligning and securely coupling a plurality of modules together to form a construction assembly, such as a temporary roadway. Other means for coupling modules together, such as removable connecting clips and locking pins may also be employed.

A cover may optionally be used in conjunction with the module for enclosing the module compartments. The cover may include a plurality of grooves formed therein for receiving end portions of the wall elements remote from said deck when the module and the cover are coupled together. Optionally, a sealing gasket may be interposed between the module and the cover.

In one embodiment the cover may be positioned on the module in one of two different orientations to form an adjustable module and cover assembly. In one of the orientations connectors may be optionally coupled to an outwardly facing side of the cover. The connectors may be used to couple multiple assemblies together. Construction panels comprising multiple assemblies may also comprise a fluid circulation system for circulating fluid within the module conduits. In one embodiment the circulating fluid regulates the temperature of the construction panels.

BRIEF DESCRIPTION OF DRAWINGS

In drawings which describe embodiments of the invention but which should not be construed as restricting the spirit or scope thereof, FIG. 1 is a top plan view of a construction module configured in accordance with one embodiment of the applicant's invention.

FIG. 2 is a side elevational view of the module of FIG. 1.

FIG. 3 is a bottom plan view of the module of FIG. 1.

FIG. 4(a) is a bottom perspective, partially exploded view of a plurality of modules arranged together in an aligned configuration and showing connecting clips removed from the modules.

FIG. 4(b) is a bottom perspective view of a plurality of modules aligned together and showing the connecting clips fully inserted for coupling the modules together.

FIG. 7(a) is an enlarged top perspective view of a plurality of modules aligned together in an offset pattern and showing the locking pins removed from the modules.

FIG. 7(b) is an enlarged top perspective view of the modules of FIG. 7(a) showing the locking pins in their fully inserted position for coupling end portions of the modules together.

FIG. 8(a) is a side elevational view of a plurality of modules aligned together and showing the locking pins removed from the modules.

FIG. 8(b) is a side elevational view of the embodiment of FIG. 8(a) showing the locking pins fully inserted to couple adjacent modules together.

FIG. 9(a) is a side elevational view of a plurality of modules aligned together and showing locking pins having a length greater than the pins of FIG. 8(a) removed from the modules.

FIG. 9(b) is a side elevational view of the embodiment of FIG. 9(a) showing the locking pins fully inserted to couple adjacent modules together.

FIG. 10 is an exploded, isometric view of a construction assembly comprising a module and a cover which may be coupled together to sealingly enclose the module compartments.

FIG. 21(a) is a top isometric view of a connector securable to the first side of a cover(s).

FIG. 21(b) is a bottom isometric view of the connector of FIG. 21(a).

FIG. 21(c) is a top plan view of the connector of FIG. 21(a).

FIG. 21(d) is a bottom plan view of the connector of FIG. 21(a).

DESCRIPTION

Figure 4C:
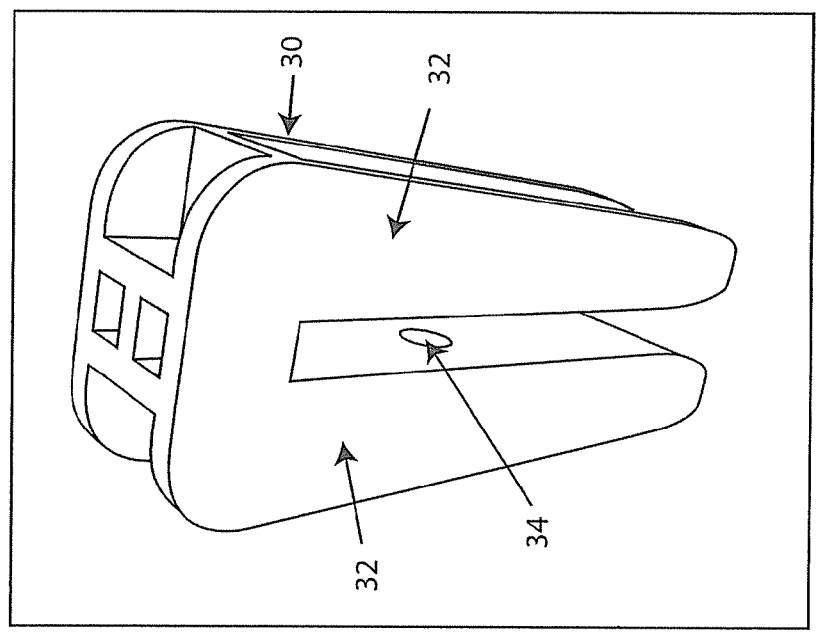
FIG. 4(c) is an enlarged perspective view of one connecting clip of FIGS. 4(a) and 4(b).
Figure 5:
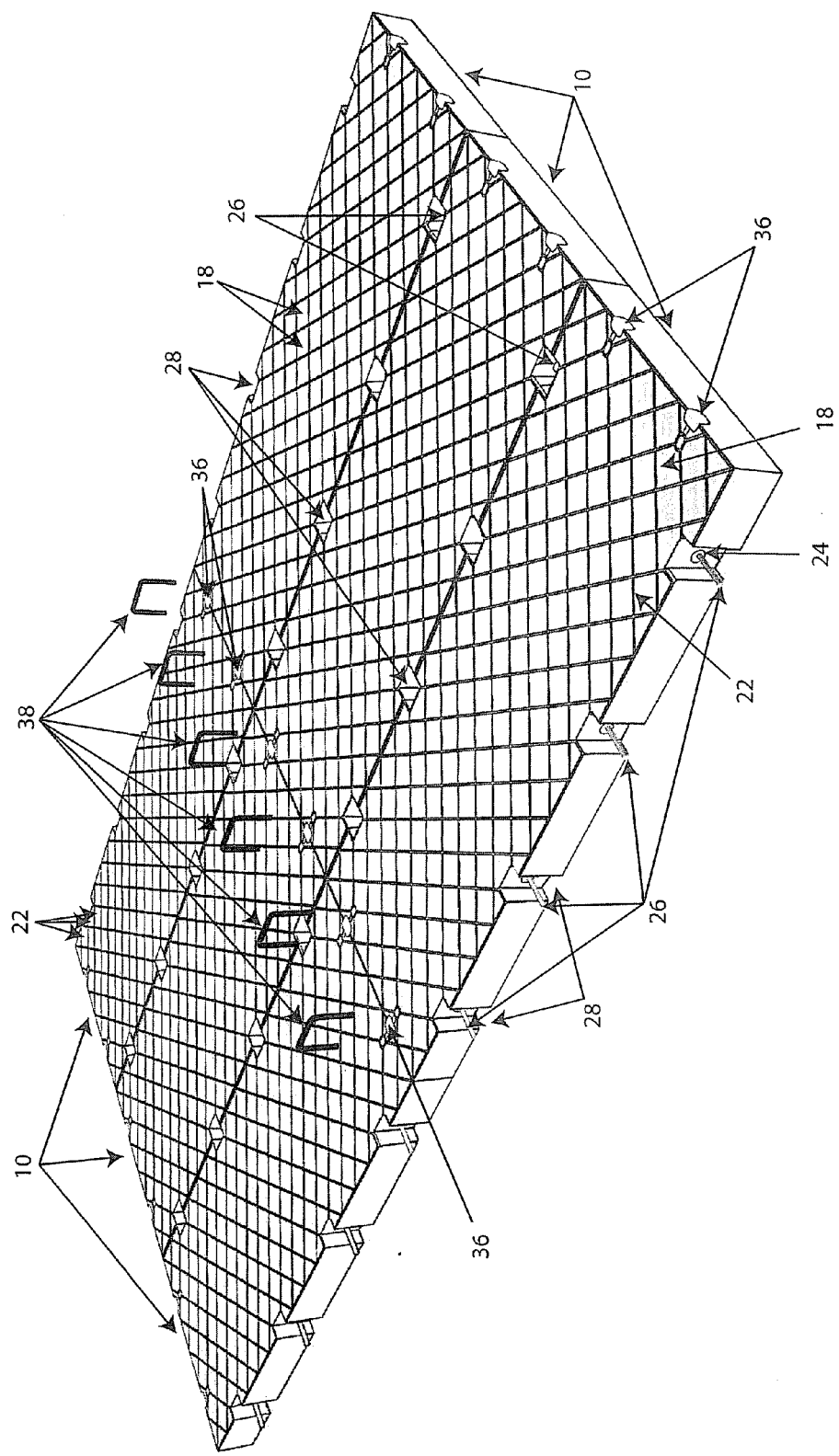
FIG. 5 is a top, perspective, partially exploded view of a plurality of modules aligned together and showing connecting cables and locking pins for coupling adjacent modules together.
Figure 6:
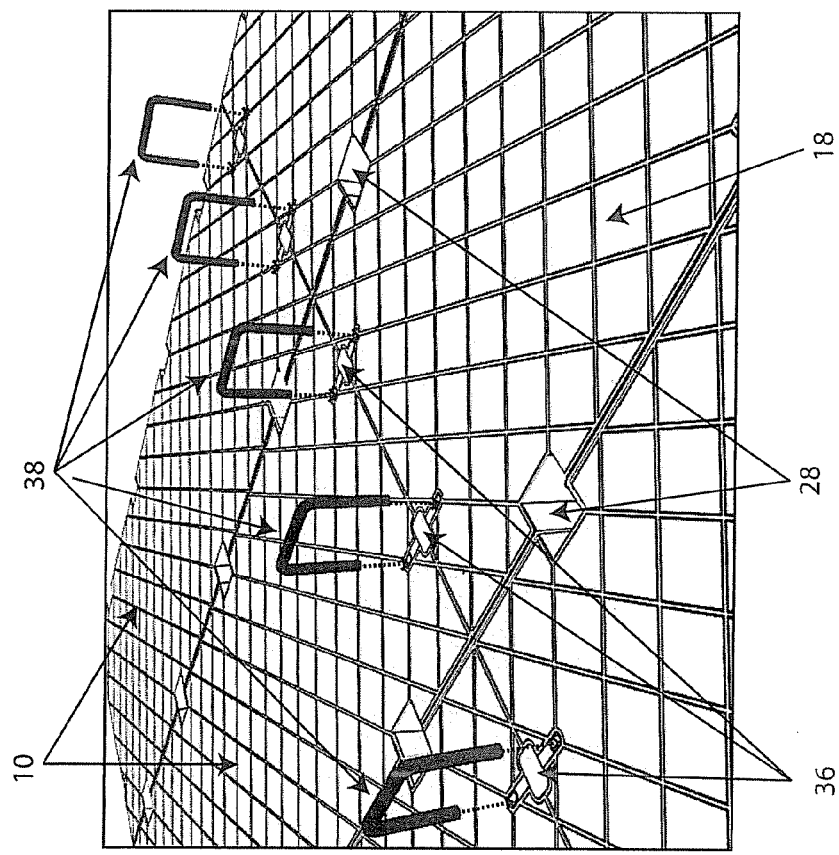
FIG. 6(a) is an enlarged top perspective view of a plurality of modules aligned together and showing the locking pins for coupling end portions of the modules together.
FIG. 6(b) is an enlarged top perspective view of the modules of FIG. 6(a) showing the locking pins in their fully inserted position flush with the top surface of the module decks.
Figure 6:
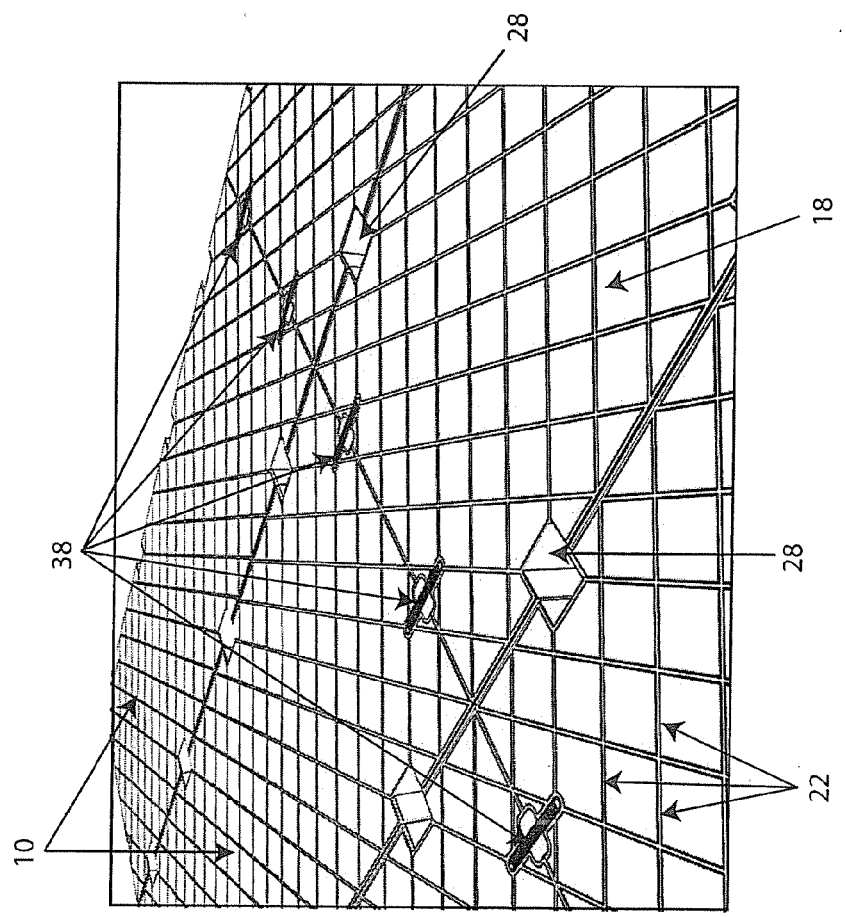

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This application relates to a multi-purpose construction module 10. In the illustrated embodiment module 10 is generally rectangular in shape. As described in further detail below, a plurality of modules 10 may be aligned in a desired configuration and releasably coupled together. Each module 10 includes a deck 12 and a plurality of wall elements 14 projecting from deck 12. In the illustrated embodiment deck 12 is a planar sheet having a first side 16 and a second side 18. Wall elements 14 project from first side 16 in a direction generally perpendicular thereto. As shown best in FIGS. 3, 4(a) and 4(b), some of the wall elements 14 define a plurality of parallel, spaced-apart partitions 19 extending longitudinally on deck 12 to provide enhanced structural support, as described below. In the illustrated embodiment, wall elements 14 are arranged to define a plurality of honeycomb-like compartments 20 each having a closed end defined by a portion of deck 12 and an open end remote from deck 12. Although compartments 20 are shown as being diamond-shaped or triangular-shaped, other shapes and arrangements are possible.

In the embodiment illustrated in FIGS. 1, 5-7 and 11, a plurality of narrow elongated ribs 22 project a short distance from second side 18 of deck 12. In this embodiment ribs 22 have the same diamond-shaped pattern as wall elements 14, although other rib patterns are also possible.

A plurality of conduits 24 extend transversely through module 10 at spaced intervals. In the illustrated embodiment conduits are cylindrical pipes which extend approximately mid-way between deck first side 16 and second side 18. As described further below, conduits 24 are provided for threading cable connectors 26 therethrough. Cable connectors 26 are one means for aligning and coupling a plurality of modules 10 together lengthwise. Module 10 may include cut-outs 28 at intervals coinciding with conduits 24 to enable ready access to end portions of conduits 24 and cable connectors 26.

As an alternative or additional means for coupling a plurality of modules together lengthwise, a plurality of connecting clips 30 may be employed as shown in FIGS. 4(a)-4(c). Each clip 30 is generally U-shaped and includes legs 32 sized to straddle adjacent sidewalls of modules 10. As best shown in FIG. 4(c), opposed clip legs 32 may also optionally include an aperture 34 for receiving a bolt (not shown) which could also pass through matching holes machined in the sidewalls of modules 10.

Each module 10 may also include a plurality of spaced slots or cut-outs 36 formed in end portions thereof. When a pair of slots 36 are aligned, a locking pin 38 may be inserted therein to couple end portions of adjacent modules 10 together. Modules 10 may either be arranged in a fully aligned configuration (FIGS. 6(a) and 6(b)) or an offset configuration (FIGS. 7(a) and 7(b)) depending upon how slots 36 on adjacent modules 10 are matched. When locking pins 38 are fully inserted into modules 10, the outermost surface of pins 38 is flush with the second side 18 of deck 12 (FIGS. 6(b) and 7(b)). As shown in FIGS. 8(a) and 8(b) the size of locking pins 38 may be about the same or less than the depth of modules 10. Alternatively, locking pins 38 may be longer than the depth of modules 10 as shown in FIGS. 9(a) and 9(b) to anchor the modules 10 in the ground when the pins 32 are fully inserted (FIG. 9(b)).

Figure 11:
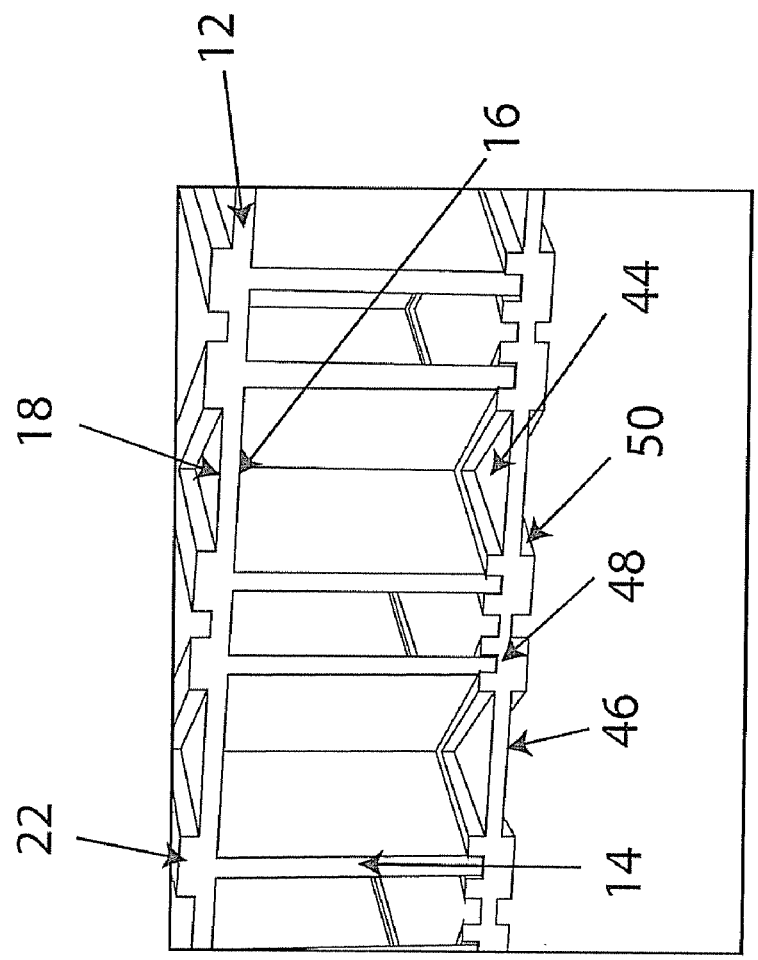
FIG. 11 is an enlarged, sectional view of a portion of the assembly of FIG. 10.

FIG. 10 illustrates an embodiment of the invention consisting of a construction assembly 40 comprising a module 10 and a cover 42. As shown best in FIG. 11, cover 42 has a first side 44 and a second side 46. A plurality of narrow slots 48 are formed on first side 44 for receiving end portions of wall elements 14. When module 10 and cover 42 are coupled together, compartments 20 are fully enclosed. A plurality of narrow elongated ribs 50 may be formed on second side of cover 42 (FIG. 11). Ribs 50 are similar to ribs 22 formed on second side 18 of deck 12.

As shown in FIGS. 4(a), 4(b) and 10, module 10 may also include a plurality of male projections 52 which fit into corresponding female apertures 54 formed in cover 42. A gasket 56 may be interposed between module 10 and cover 42 to sealingly couple the components together (FIG. 10). Further, a plurality of fasteners 58 may be used for fastening cover 42 to module 10.

In one preferred embodiment, both module 10 and cover 42 are formed from plastic. For example, module 10 and cover 42 may be manufactured from plastic molds in a mass production process. Since both module 10 and cover 42 may be formed or substantially formed from cast plastic, construction assembly 40 is very light-weight in this embodiment. In one embodiment conduits 24 and cable connectors 26 may be formed from metal.

As will be apparent to a person skilled in the art, modules 10 may be manufactured in any desired size or shape. By way of example, modules 10 may be about 3'×8' in size and generally rectangular in shape.

Module 10 has many possible construction applications. For example, module 10 may be used separate from cover 42 as a mold for settable materials such as concrete. In this embodiment, one or more modules 10 could be deployed as shown in FIGS. 4(a) and 4(b) with the open ends of compartments 20 facing upward. The settable material could be introduced into all or some of compartments 20 through the open ends thereof. Partitions 19 provide module 10 with longitudinal strength and stability to prevent deformation of module 10 as compartments 20 are being progressively filled. Depending upon the application, multiple modules may be aligned and coupled together as described above to form multi-module construction assemblies. Again, the modules 10 should be coupled together sufficiently securely to prevent deformation or distortion of the multi-module assembly as selected modules 10 or module compartments 20 are filled. If necessary, bolts (not shown) may be used in conjunction with connecting clips 30. With reference to FIG. 9(b), multiple modules 10 may also be anchored in the ground or other underlying support surface using locking pins 38.

In another application module 10 could be filled with sand or other granular materials to stabilize roadways and the like and prevent washout. Depending upon the specific application, module 10 could be deployed with the with the granular material filled within the module compartments 20 with the open ends of compartments 20 facing either upwards or downwards.

In yet another application, modules 10 may be used in conjunction with cover 42 to form a light-weight construction assembly 40 suitable for making temporary roads and the like. This embodiment of the invention is particularly suitable for deployment on unstable ground, such as arctic tundra or wetlands. Assembly 40 is deployed in the orientation shown in FIGS. 10 and 11 with cover 42 placed on the ground surface. A plurality of assemblies 40 may be assembled lengthwise using cable connectors 26 passed through conduits 24 of the respective modules 10, as discussed above. Since assemblies 40 are lightweight and stackable, they may be quickly deployed at the construction site, even at remote locations. The sealing connection between respective modules 10 and covers 42 prevents entry of mud and water into compartments 20 which would otherwise substantially increase the weight of the assemblies 40. End portions of modules 10 could also be aligned and coupled together as described above to increase the width of the temporary roadway or other support. Thus assemblies could be used as supports to distribute weight over a large surface area while remaining stable and structurally strong in different weather and ground conditions. In the orientation shown in FIGS. 1, 5, 6(a)-7(b), 10, and 11, ribs 22 formed on deck second side 18 project upwardly to provide traction for vehicles traveling thereover. As shown in the drawings, deck side 18 may be a continuous sheet to provide a uniform support surface. Since locking pins 38 are flush with deck side 18 in their fully inserted position (FIGS. 6(b) and 7(b)), they will not interfere with vehicle traffic or the like on deck 12.

As will be appreciated by a person skilled in the art, construction module 10 could be used for many other purposes and applications. For example, in one further application may be used as a light-weight storage container or shelving unit. In another further application module 10 could be used as part of a scaffolding system.

Figure 12:
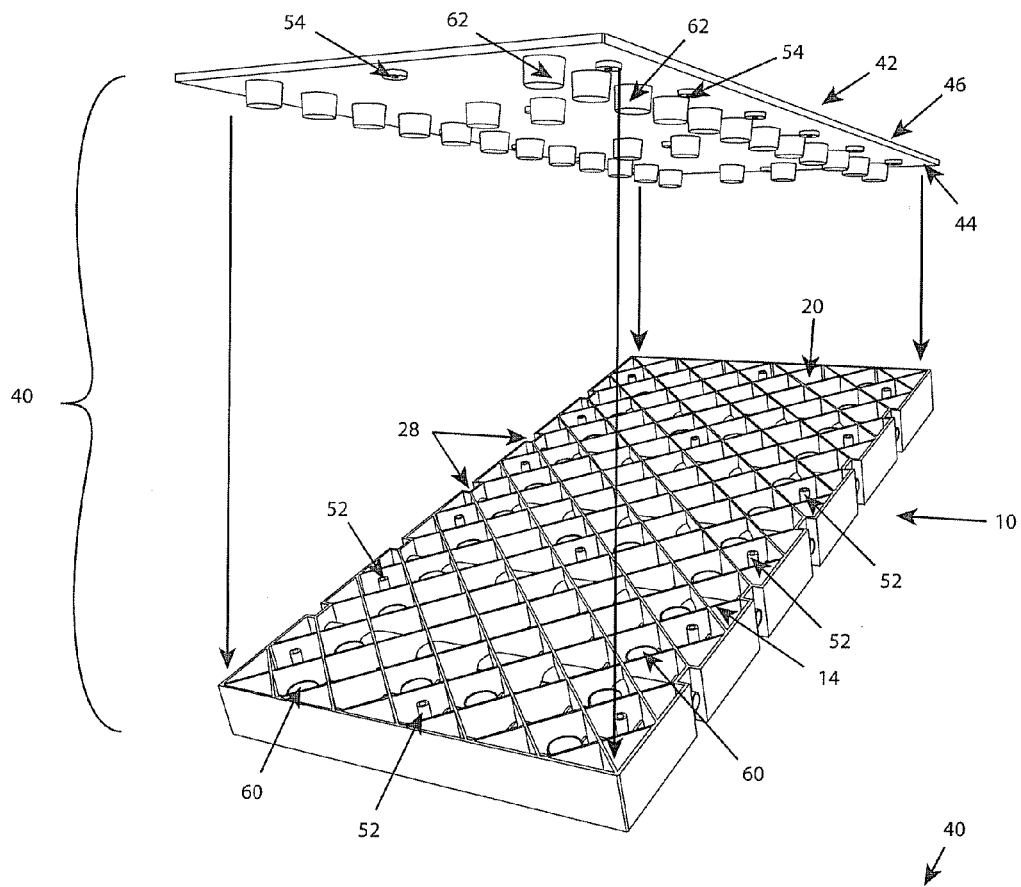
FIG. 12(a) is an exploded, isometric view of an assembly comprising a module and a cover and showing the cover in a first orientation wherein a first side of the cover faces inwardly toward the module compartments and a second side of the cover faces outwardly.
FIG. 12(b) is an assembled, isometric view of the assembly of FIG. 12(a).
FIG. 12(c) is an isometric view of a construction panel comprising a plurality of assemblies as shown in FIG. 12(b) coupled together with cables threaded through the module conduits.
Figure 12:
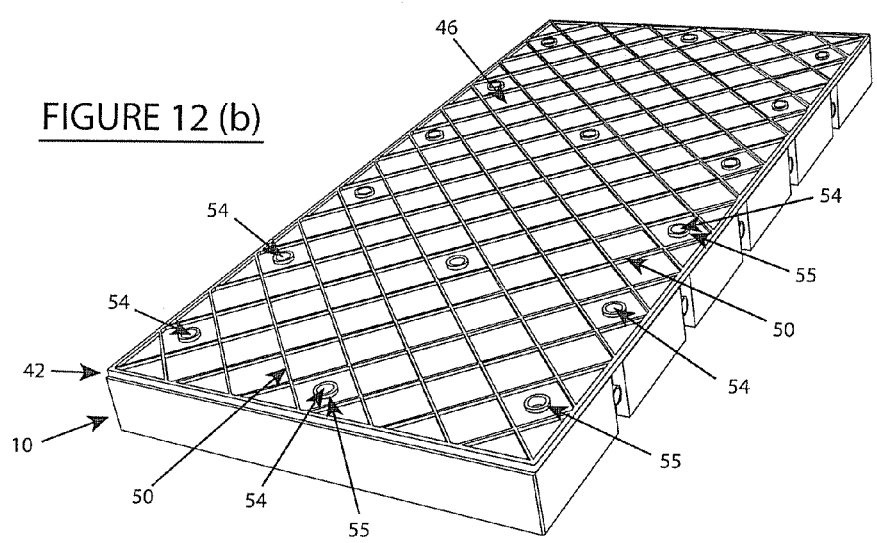
Figure 12:
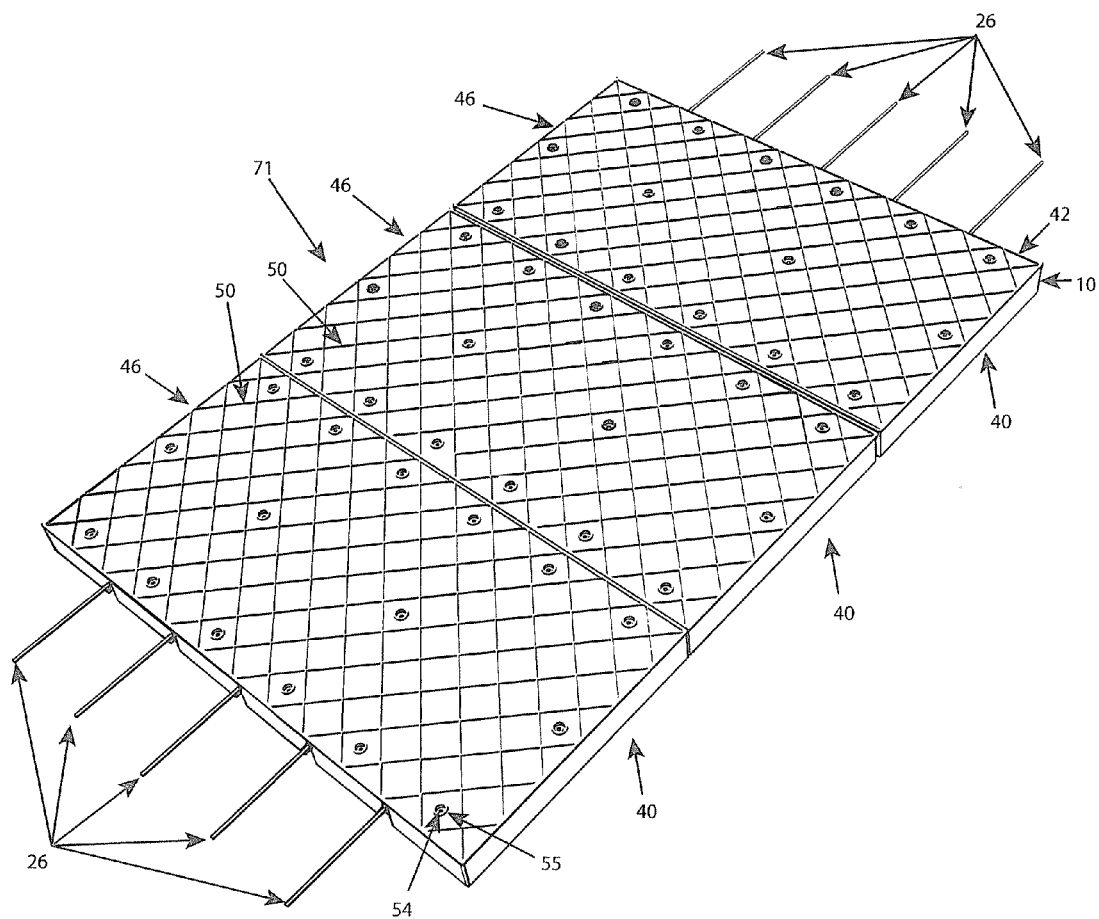
Figure 13:
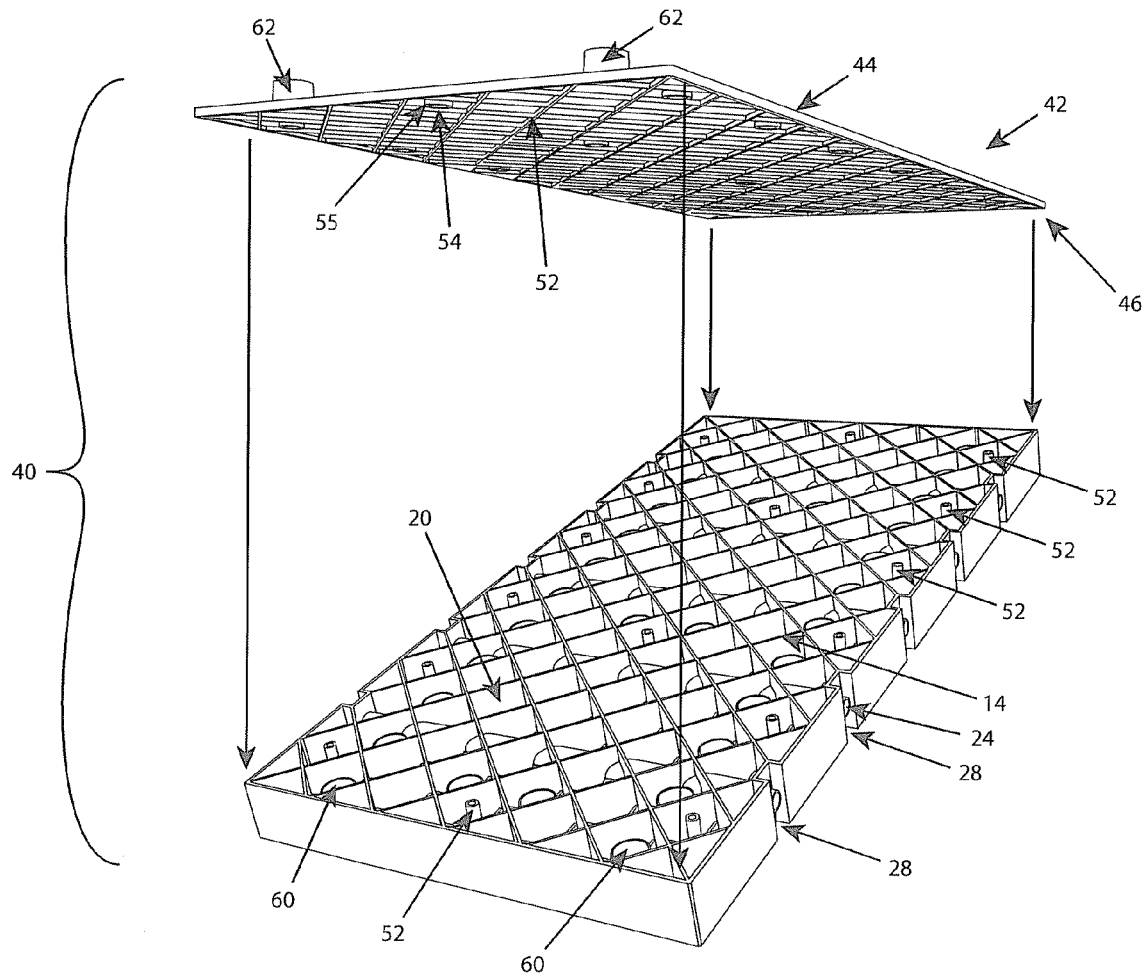
FIG. 13(a) is an exploded, isometric view of an assembly comprising a module and a cover and showing the cover in a second orientation wherein a second side of the cover faces inwardly toward the module compartments and a first side of the cover faces outwardly.
FIG. 13(b) is an assembled, isometric view of the assembly of FIG. 13(a).
FIG. 13(c) is an isometric view of a further embodiment of a module and cover assembly in the second orientation showing a bolt fastener for holding the assembly together.
FIG. 13(d) is a top, plan view of the cover portion of assembly of FIG. 13(c).
FIG. 13(e) is a first side elevational view of the assembly of FIG. 13(c).
FIG. 13(f) is a second side elevational view of the assembly of FIG. 13(c).
FIG. 13(g) is an enlarged, end elevational view of the assembly of FIG. 13(c).
FIG. 13(h) is a bottom, plan view of the module portion of the assembly of FIG. 13(c).
Figure 13:
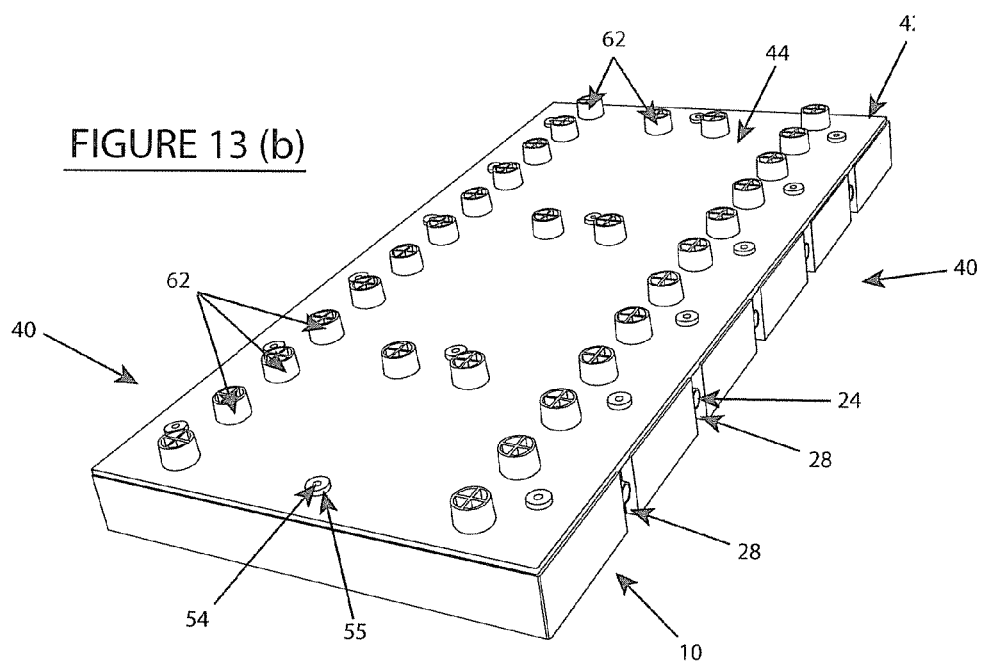
Figure 13:
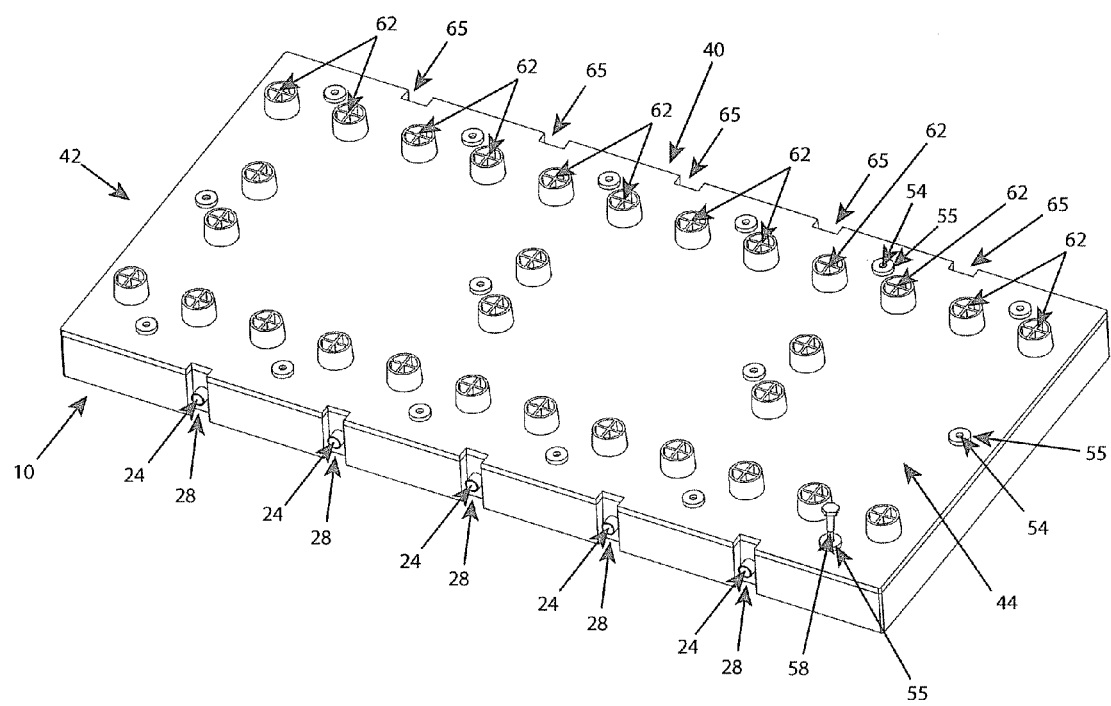
Figure 13:
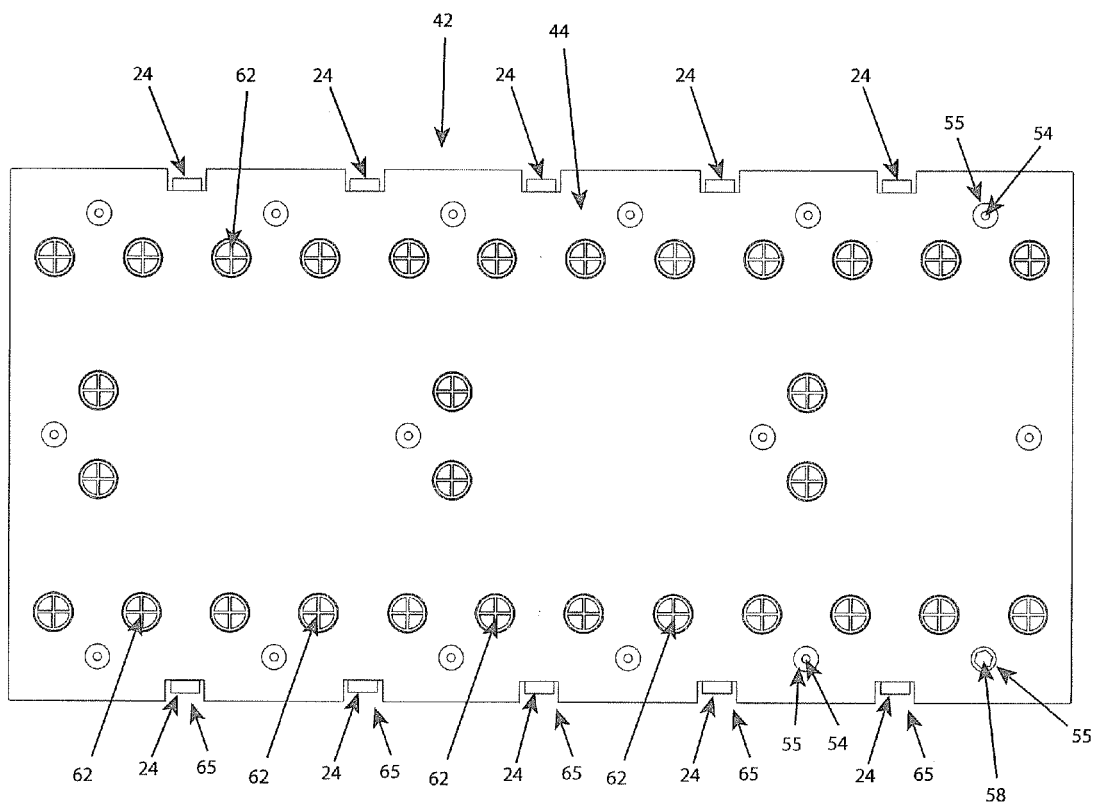
Figure 13:
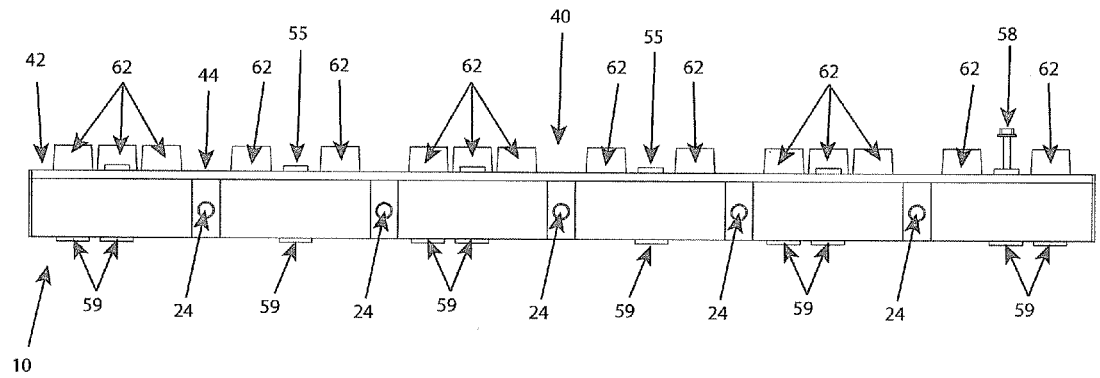
Figure 13:
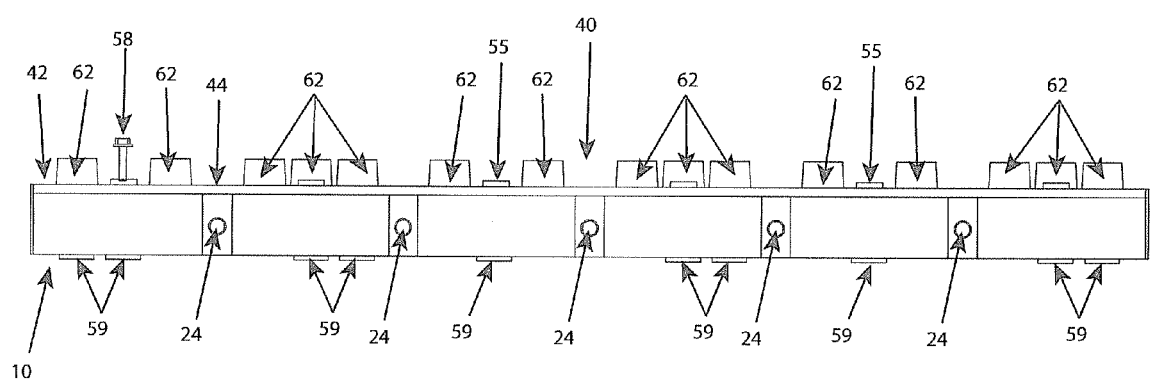
Figure 13:
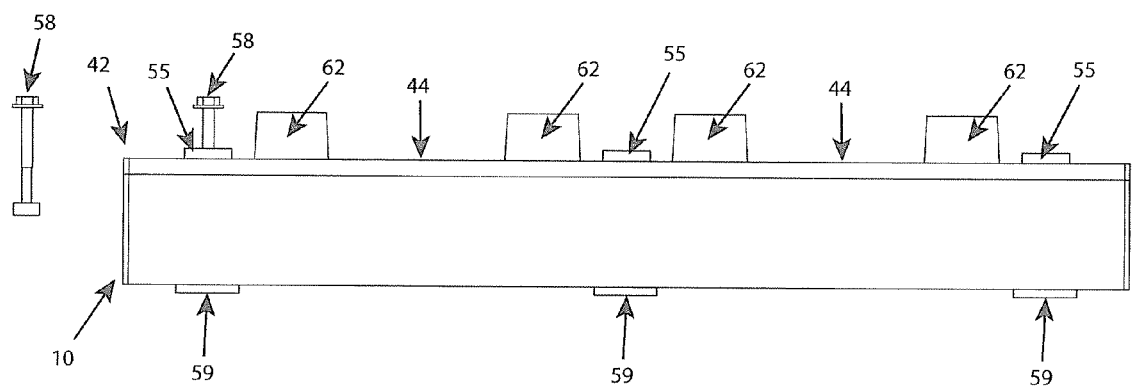
Figure 13:
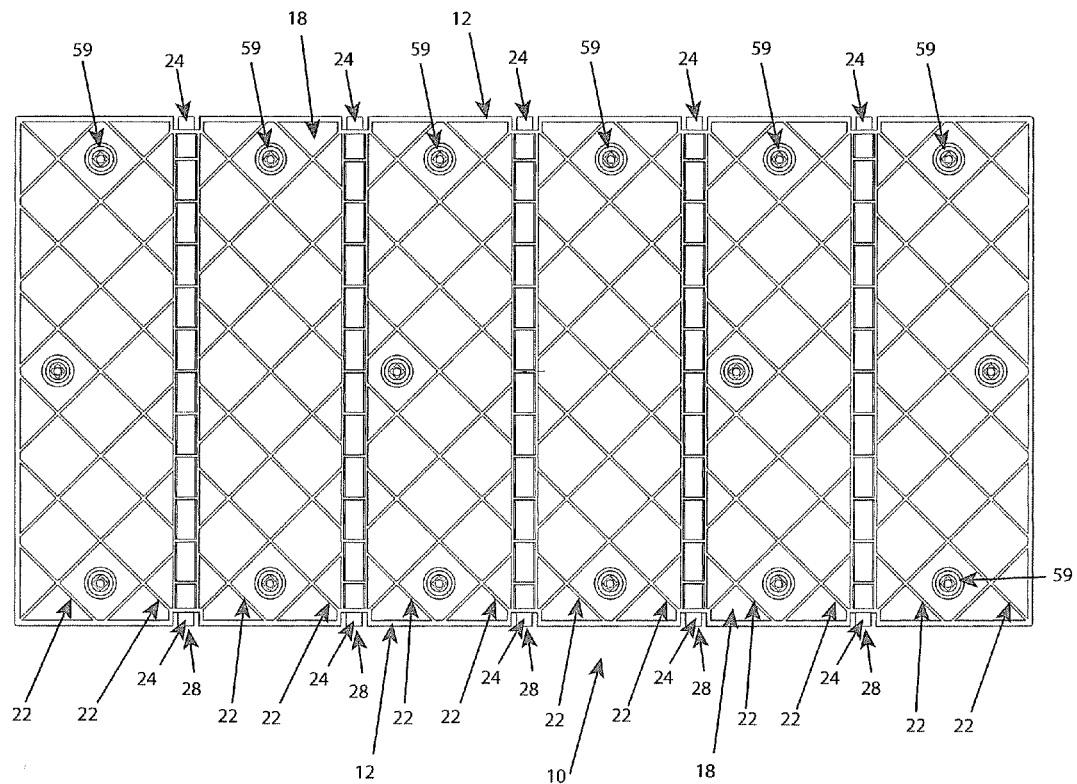
Figure 14:
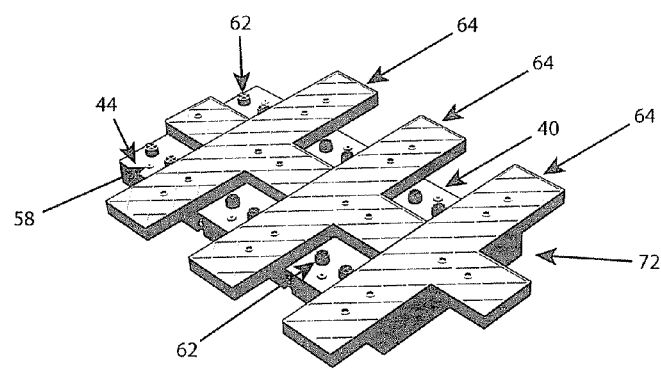
FIG. 14(a) is a isometric view of the assembly of 13(b) and further comprising connectors securable to the first side of the cover.
FIG. 14(b) is an isometric view of a partially assembled construction module comprising two assemblies as defined in FIG. 13(b) and further including connectors securable to the first side of each of the covers for connecting the assemblies together.
FIG. 14(c) is an isometric view of the construction module of FIG. 14(b) and further including a ramp connector securable to the first side of a cover.
Figure 14:
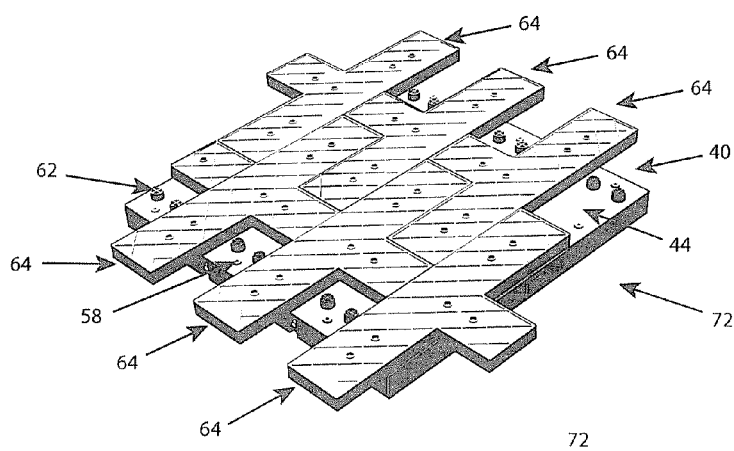
Figure 14:
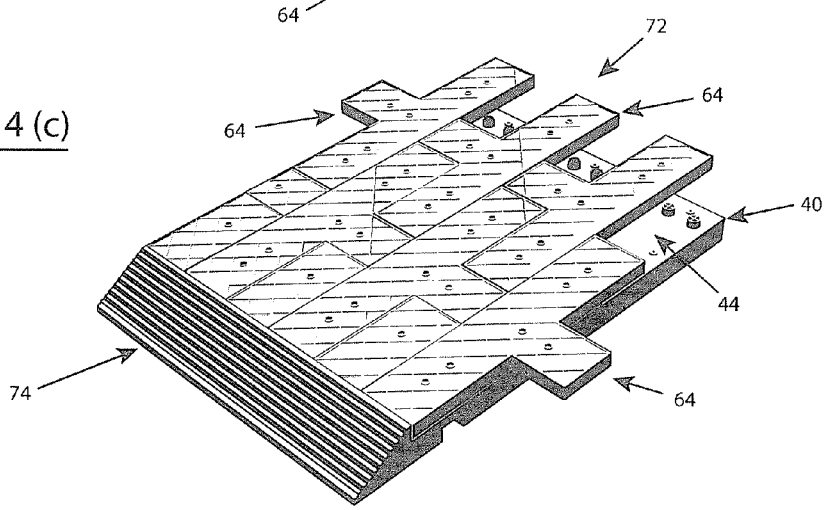

FIGS. 12-27 illustrate further embodiments of the invention. As in the embodiment of FIG. 10, a construction assembly 40 is disclosed comprising a module 10 and a cover 42. Cover 42 includes a first side 44 and a second side 46. Cover 42 may be optionally coupled to module 10 in either a first orientation with first side 44 facing inwardly toward module compartments 20 and second side 46 facing outwardly (FIG. 12(a)) or a second orientation with second side 46 facing inwardly toward module compartments 20 and first side 44 facing outwardly (FIG. 13(a)).

Module 10 and cover 42 include means for matingly engaging one another in either the first or second orientations. More particularly, in the illustrated embodiment, module 10 includes a plurality of spaced-apart, apertured male projections 52 extending from compartment wall elements 14. Module 10 also includes a plurality of female sleeves 60 arranged at spaced intervals. Cover 42 includes a plurality of apertures 54 and a plurality of male projections or pins 62. When module 10 and cover 42 are coupled together in either the first or second orientations module male projections 52 are received in corresponding apertures 54 formed in cover 42. In the first orientation (with first side 44 facing module compartments 20 (FIGS. 12(a) and 12(b)), cover male projections 62 are received in corresponding female sleeves 60 formed in module 10. As shown best in FIG. 13(c), cover 42 may also include a plurality of collars 55 surrounding corresponding apertures 54. Collars 55 may, for example, be small annular disks formed of rubber.

Fasteners 58 (FIG. 13(c)) may also be provided for removably coupling module 10 and cover 42 together. For example, fasteners 58 may consist of threaded bolts which are inserted through cover apertures 54 and module male projections 52. A plurality of nuts 59 are provided on second side 18 of module deck 12 in alignment with projections 52 (FIG. 13(h)) for threadingly receiving fasteners 58. Fasteners 58 may be inserted until the fastener head contacts a corresponding aperture collar 55. Although only one fastener 58 is shown in FIG. 13(c), a person skilled in the art will appreciate that a plurality of fasteners 58 may be used to securely couple module 10 and cover 42 together.

As in the embodiment described above, the second side 46 of cover 42 may include a plurality of ribs 50 to provide a textured surface, for example to provide traction for vehicles traveling thereover (FIG. 12(b)).

FIG. 12(c) illustrates a construction panel 71 comprising three separate construction assemblies 40 aligned together and held together by cable connectors 26 extending through module conduits 24. In this embodiment the cover 42 of each assembly is deployed in the first orientation with the cover first side 44 facing inwardly and second side 46 facing outwardly. Second sides 46 of aligned assemblies 40 together defined a substantially planar deck surface (which may include ribs 50). By increasing the number of assemblies 40 coupled together in this manner, the size of the construction panel 71 can be increased to suit the desired application.

FIGS. 13(a) and 13(b) shown module 10 and cover 42 coupled together in the second orientation with second side 46 facing inwardly toward module compartments 20 and first side 44 facing outwardly. Fasteners 58 may be employed for securing module 10 and cover 42 together in either of the first and second orientations as described above. In the embodiment illustrated in FIGS. 13(a) and 13(b), cover 42 is a rectangular sheet which covers module cut-outs 28. FIGS. 13(c)-13(h) illustrate a similar embodiment of the invention where cover 42 includes cut-outs 65 matching the location and shape of module cut-outs 28 (FIG. 13(a)). Matching cut-outs 28, 65 allow access to end portions of conduits 24, as shown, for example in FIG. 25(a).

FIGS. 17(a)-17(e) show additional detailed views of module 10 and FIGS. 18(a)-18(f) show additional detailed views of cover 42. FIGS. 19(a)-19(d) and 20(a)-20(d) further illustrate how module 10 and cover 42 may be coupled together in either the first or second orientations.

In the second orientation, male projections 62 project outwardly from cover first side 44 (FIGS. 13(a) and 13(c)). If desired, a plurality of module connectors 64 may be secured to male projections 62 in this orientation for fastening two or more modules 10 together (FIGS. 14 (a)-14 (c)). The undersurface of each connector 64 includes one or more female sleeves 66, as shown best in FIGS. 21(b) and 21(d). Each sleeve 66 is sized for receiving a corresponding male projection 62. Each connector 64 also include apertures 68 which are alignable with cover apertures 54 to enable passage of fasteners 58 therethrough. As shown in the drawings, apertures 68 may be defined by elongate cylindrical elements. Fasteners 58 may be used for securing connectors 64 to cover 40 and/or module 10. The length of fasteners 58 (shown in FIG. 13(c)) may be designed accordingly (i.e. so fasteners 58 are of sufficient length to pass through connectors 64, cover 42, module 10 and into threaded engagement with a corresponding nut 59).

In the illustrated embodiment, the undersurface of each connector 64 has a configuration similar to module 10, i.e. comprising a plurality of compartments 20 defined by projecting wall elements 14. The upper surface of each connector 64 resembles the deck second side 18 of modules 10 and includes ribs 70 similar to module ribs 22. As will be understood by a person skilled in the art, the location of sleeves 66 and apertures 68 formed on connectors 64 may be configured to at least partially match the pattern of apertures 54 and projections 62 formed on cover 42. Thus connectors 64 may be used to couple two or more construction assemblies 40 together in different patterns or configurations to form an integrated construction panel 72 in a manner generally similar to children's toy building blocks. Because connectors 64 are used in this embodiment as the means for holding adjacent assemblies 40 together, the overall thickness of panel 72 is greater than the panel 71 of FIG. 12(*c*). However, as in the FIG. 12(*c*) embodiment, cables 26 or other connectors may also optionally be used for aligning and coupling assemblies 40 to form construction panel 72. Since panel 72 is thicker and mechanically stronger than panel 71, it can support a larger load.

Figure 22:
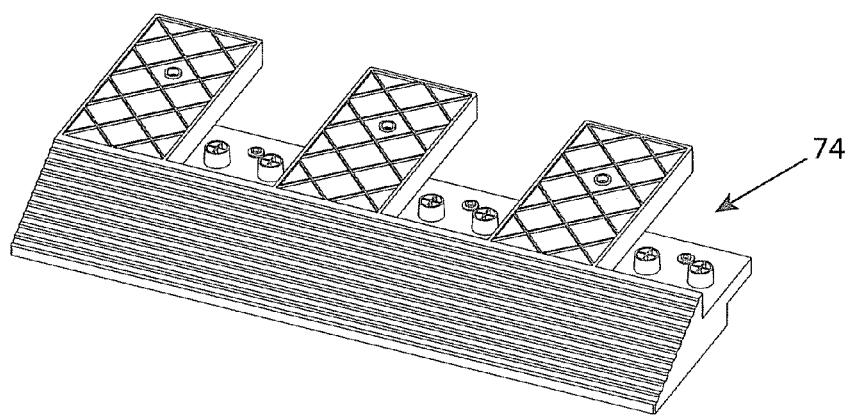
FIG. 22(a) is a top isometric view of a ramp connector.
FIG. 22(b) is a bottom isometric view of a ramp connector.
Figure 22:
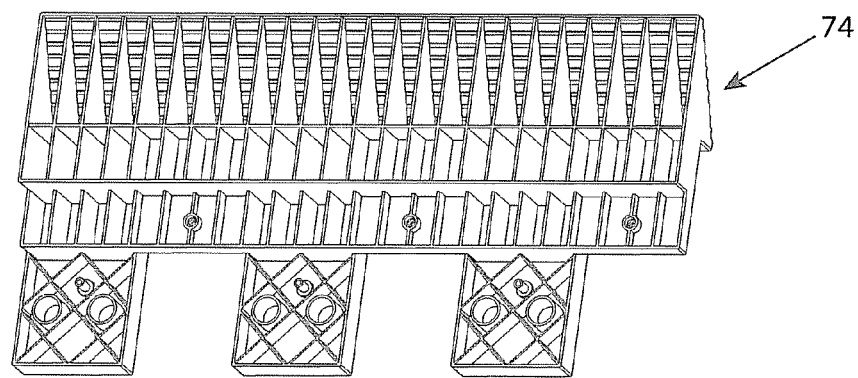
Figure 23:
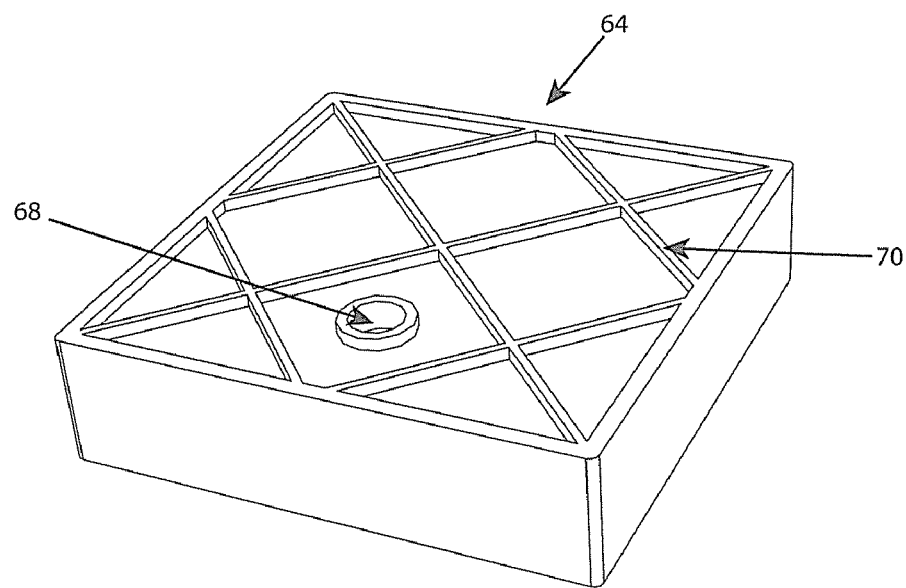
FIG. 23(a) is a top isometric view of a square connector.
FIG. 23(b) is a bottom isometric view of a square connector.
Figure 23:
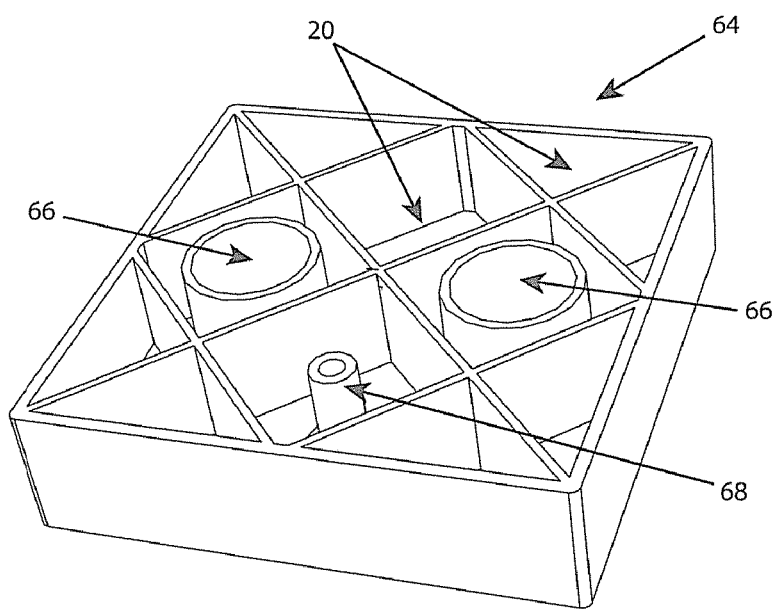
Figure 24:
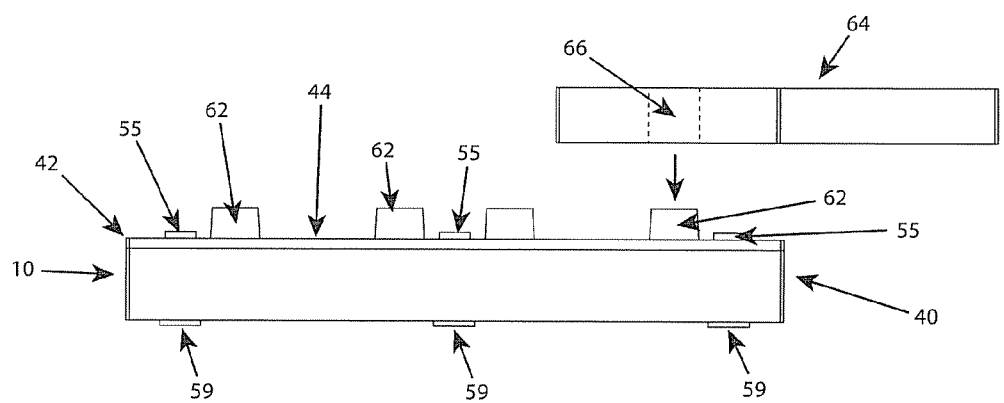
FIG. 24(a) is a side elevational view of connector securable to the first side of a cover for coupling multiple assemblies together.
FIG. 24(b) is a side elevational view of the connector of FIG. 24(a) secured to the cover.
Figure 24:
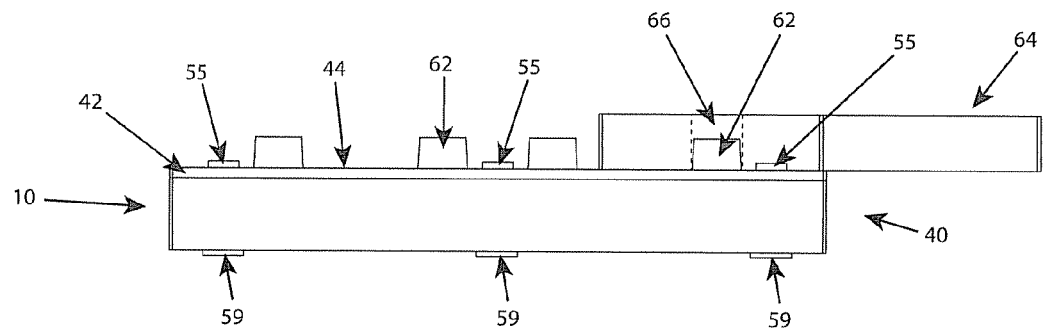

As shown best in FIGS. 21-23, module connectors 64 may be formed in different shapes and size. For example, some connectors 64 may be generally T-shaped or L-shaped. Other connectors 64 may be square, rectangular or other suitable shapes for insertion in gaps defined between other connectors 64. Accordingly, once connectors 64 are fully assembled to construction assemblies 40, they together define a substantially flat outer surface of construction panel 72 for supporting vehicle traffic or the like, as discussed further below. One or more ramp connectors 74 (FIG. 22) may also be provided at the ends or other peripheral locations of panel 72 to facilitate movement of vehicles or heavy equipment thereon.

Figure 15:
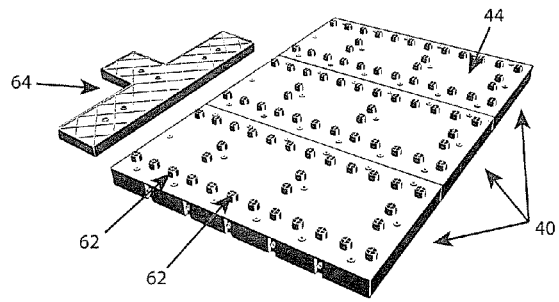
FIGS. 15(a)-15(h) are perspective views illustrating sequential steps for assembling a construction panel by connecting multiple assemblies together using a plurality of separate connectors.
Figure 15:
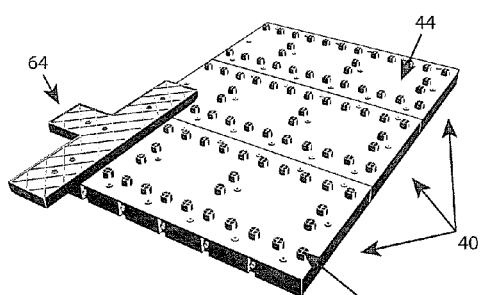
Figure 15:
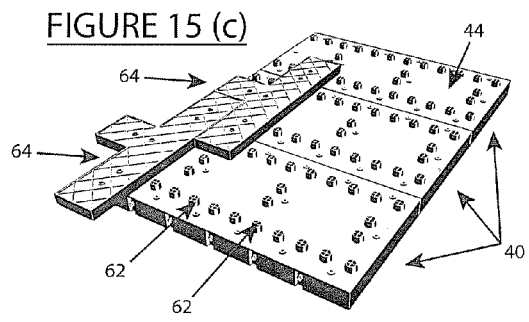
Figure 15:
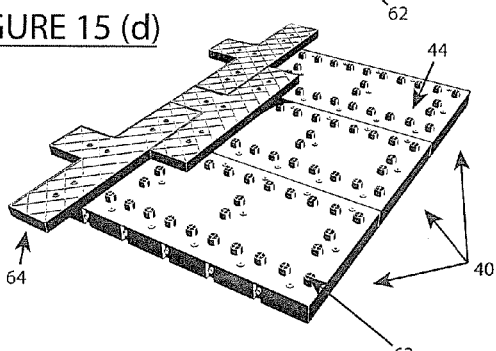
Figure 15:
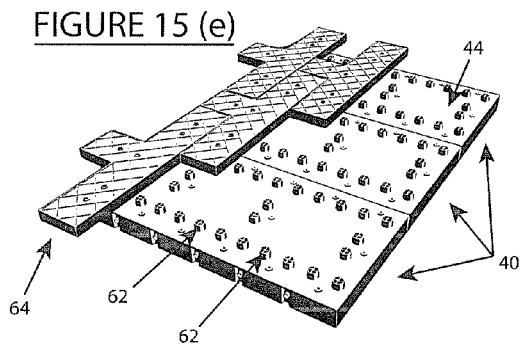
Figure 15:
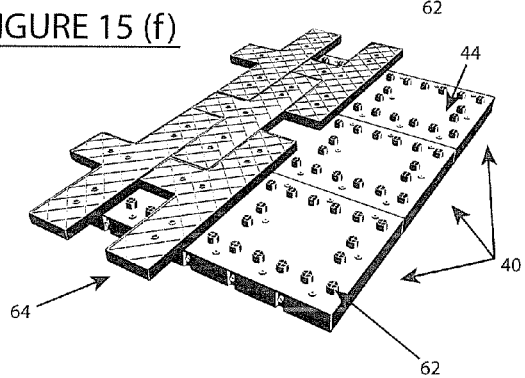
Figure 15:
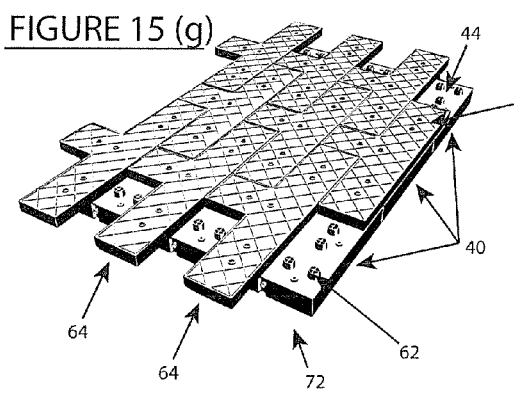
Figure 15:
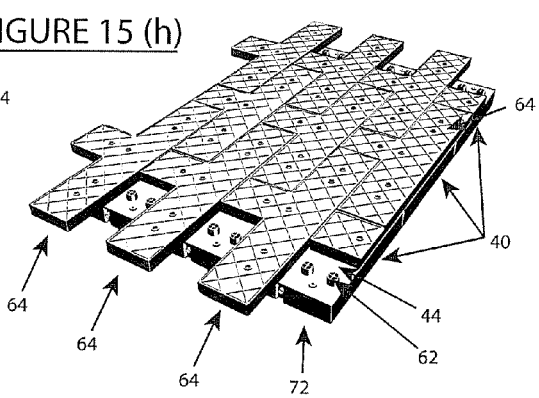
Figure 16:
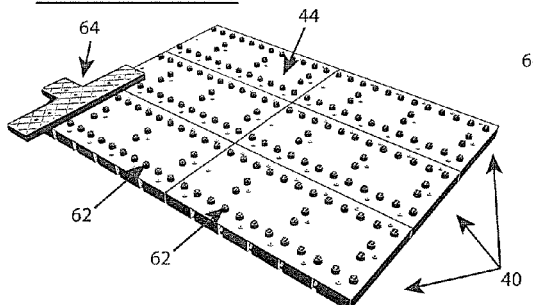
FIG. 16(a)-16(h) are perspective views similar to FIGS. 15(a)-15(h) illustrating sequential steps for assembling a larger width construction panel by connecting multiple assemblies together using a plurality of separate connectors.
Figure 16:
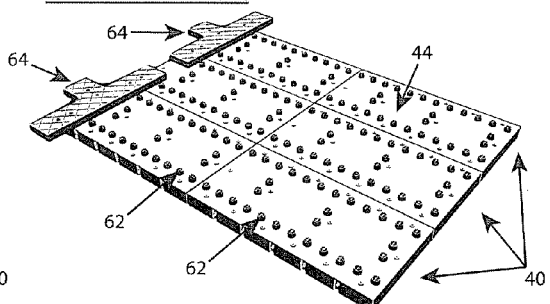
Figure 16:
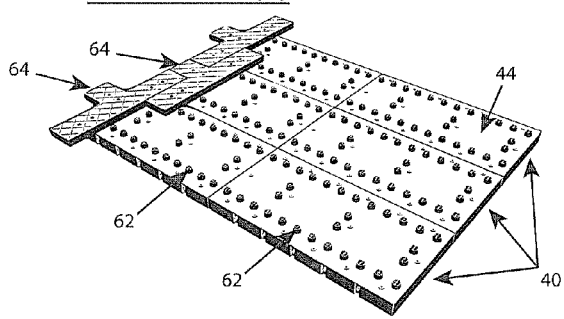
Figure 16:
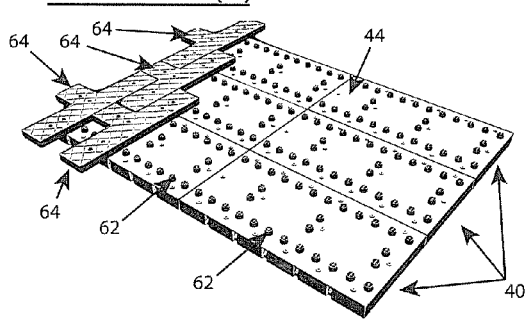
Figure 16:
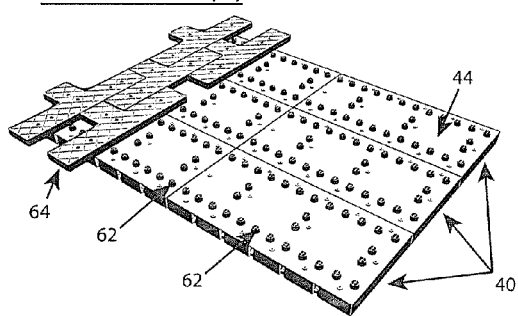
Figure 16:
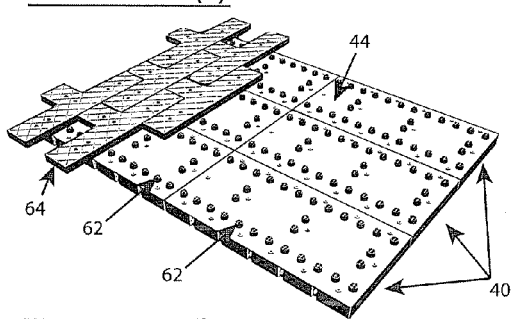
Figure 16:
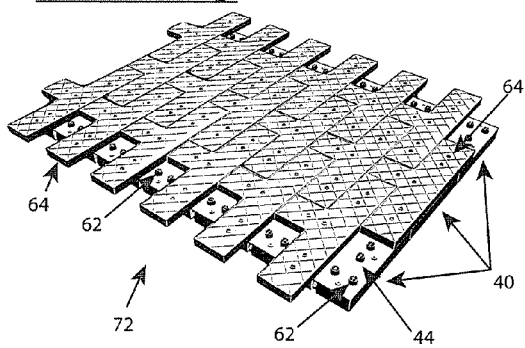
Figure 16:
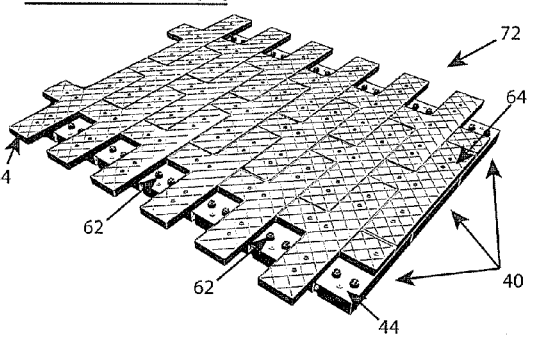
Figure 17:
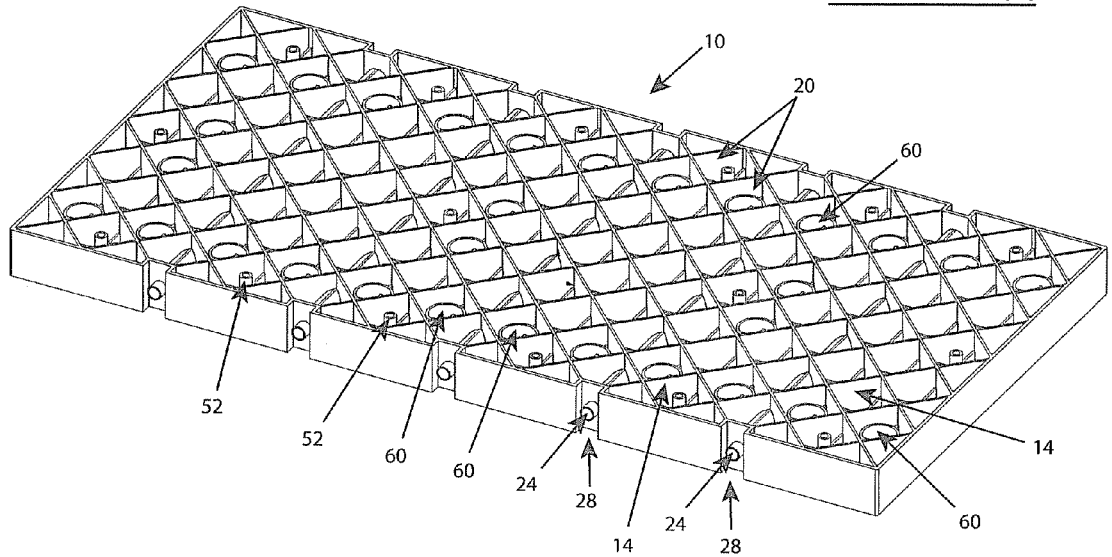
FIG. 17(a) is a top perspective view of a module configured in accordance with the embodiment of the invention of FIGS. 12 and 13.
FIG. 17(b) is a bottom perspective view of the module of FIG. 17(a).
FIG. 17(c) is a top plan view of the module of FIG. 17(a).
FIG. 17(d) is a bottom plan view of the module of FIG. 17(a).
FIG. 17(e) is a side elevational view of the module of FIG. 17(a).
Figure 17:
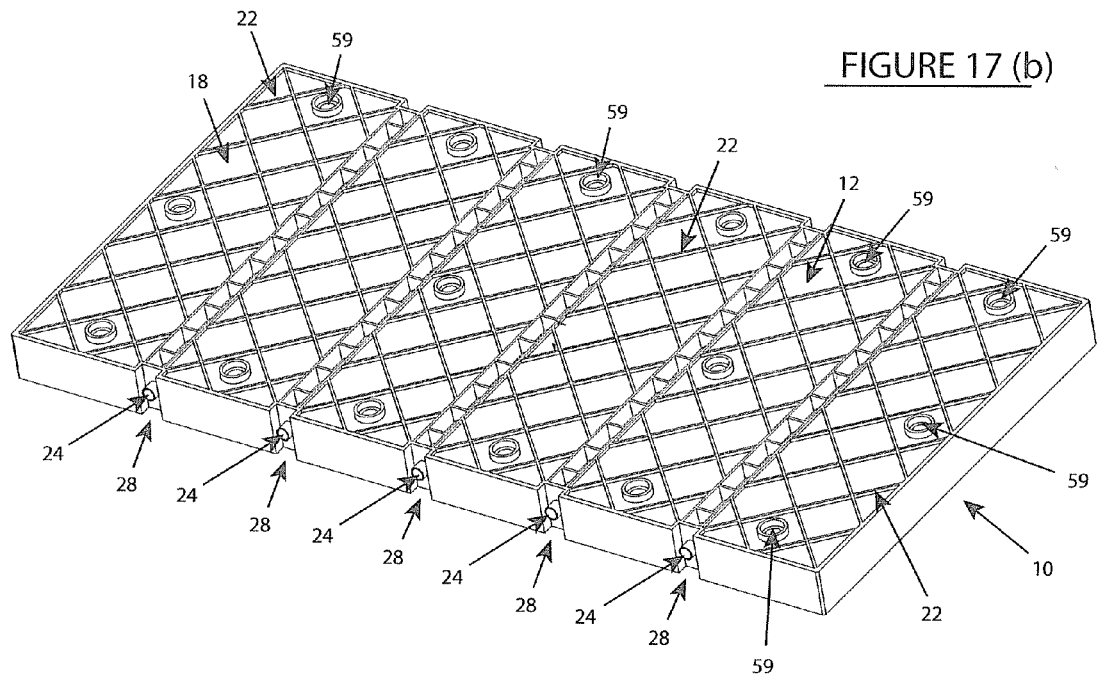
Figure 17:
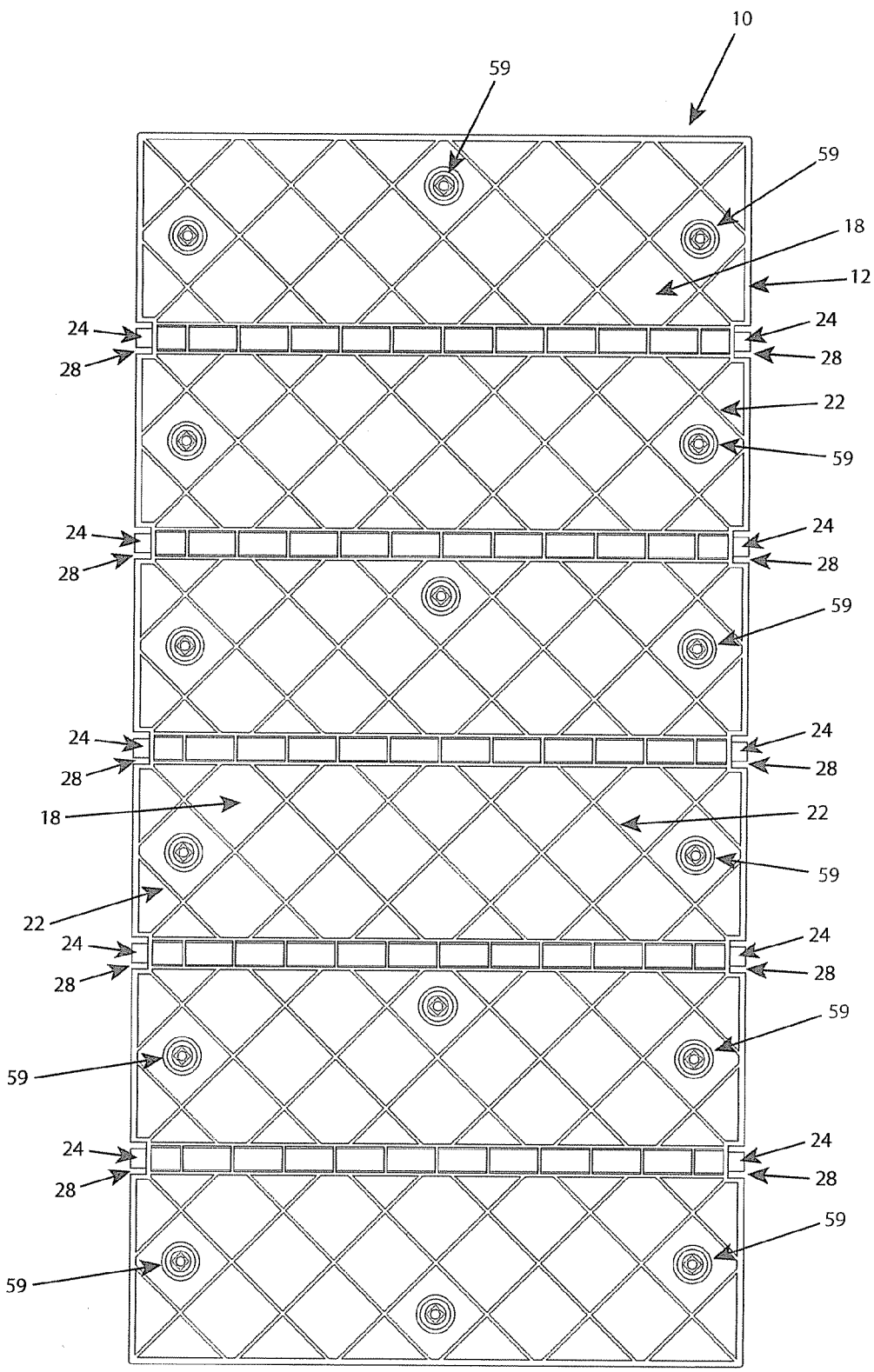
Figure 17:
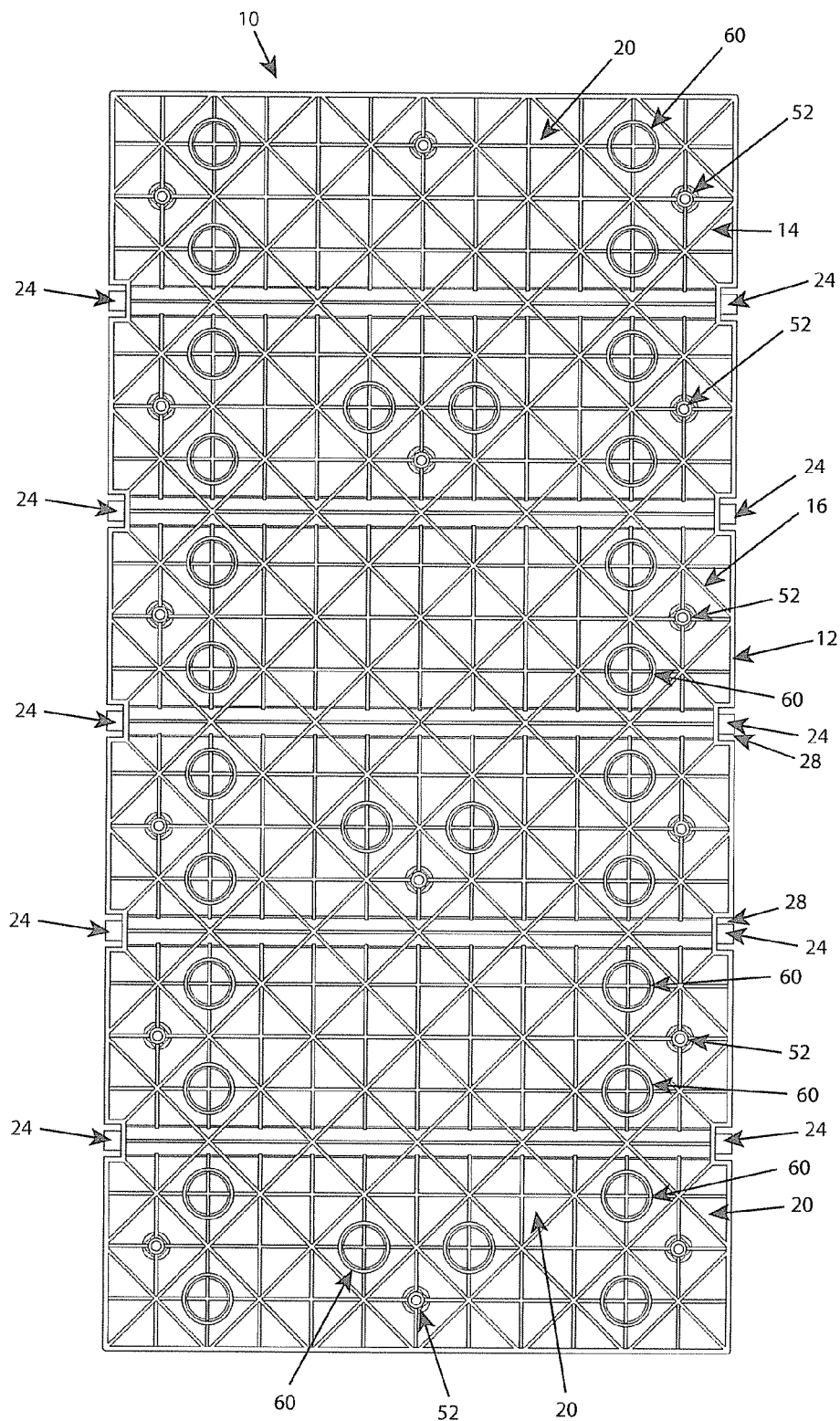
Figure 17:
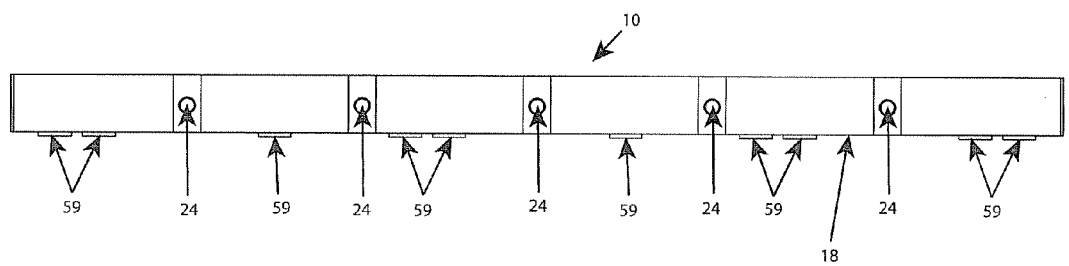
Figure 18:
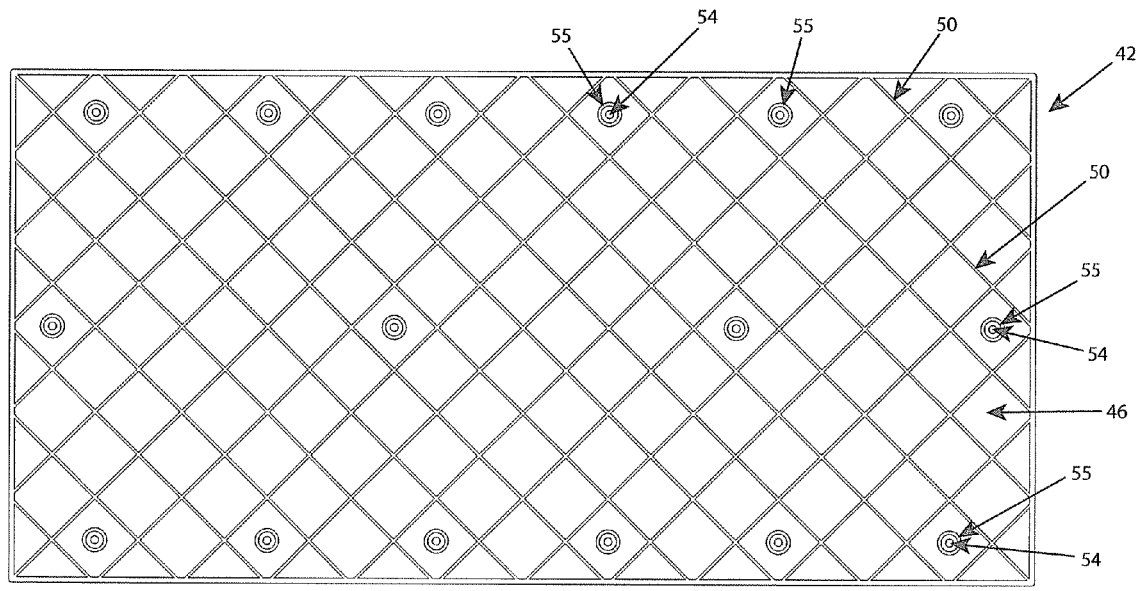
FIG. 18(a) is a perspective view of the cover in the second orientation with the cover first side facing upwardly and the second side facing downwardly.
FIG. 18(b) is a perspective view of the cover in the first orientation with the cover second side facing upwardly and the first side facing downwardly.
FIG. 18(c) is a top plan view of the cover of FIG. 18(a).
FIG. 18(d) is a top plan view of the cover of FIG. 18(b).
FIG. 18(e) is a side elevational view of the cover of FIG. 18(a).
FIG. 18(f) is an end elevational view of the cover of FIG. 18(a).
Figure 18:
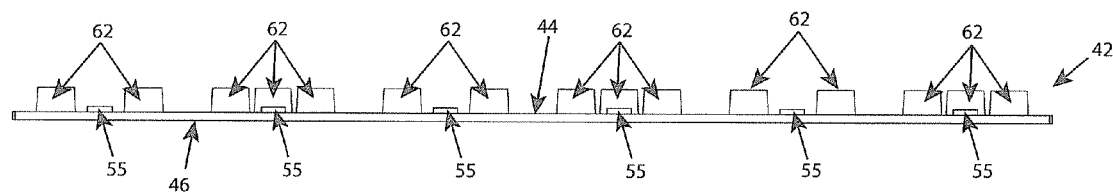
Figure 18:
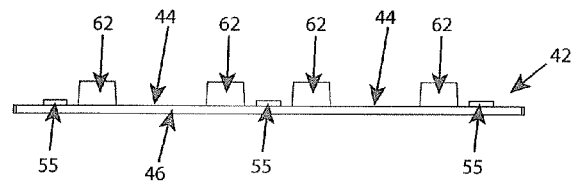
Figure 19:
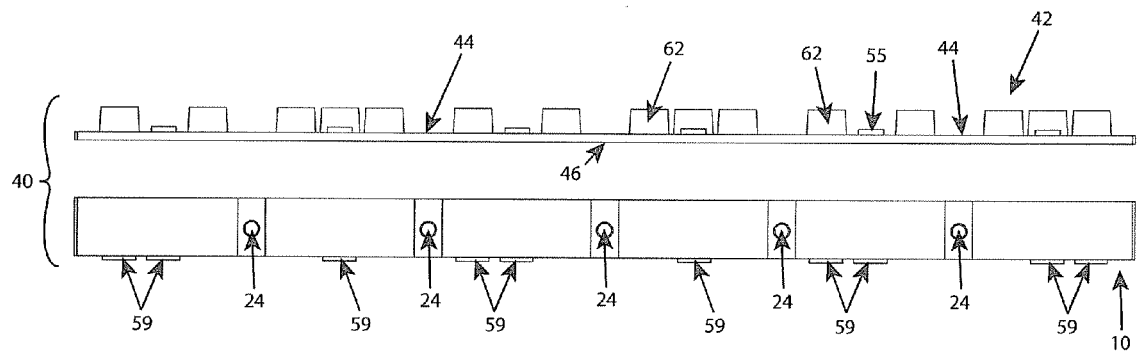
FIG. 19(a) is a partially exploded side elevational view showing assembly of the module and cover of FIG. 12(a) where the first side of the cover faces upwardly.
FIG. 19(b) is a fully assembled, side elevational of the module and cover of FIG. 12(d).
FIG. 19(c) is a partially exploded end elevational view showing assembly of the module and cover of FIG. 12(a)
FIG. 19(d) is a fully assembled, end elevational of the module and cover of FIG. 12(d).
Figure 19:
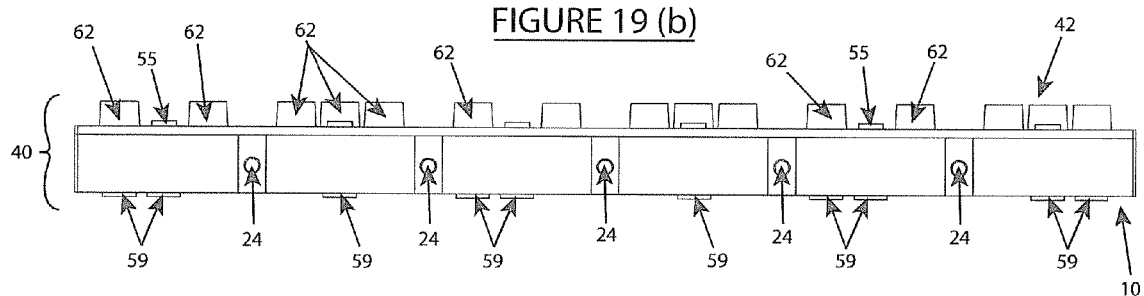
Figure 19:
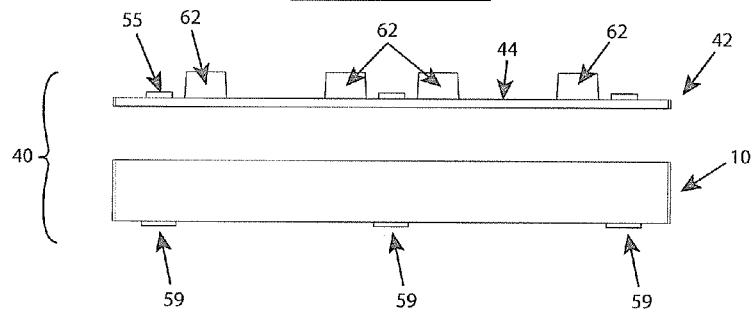
Figure 19:
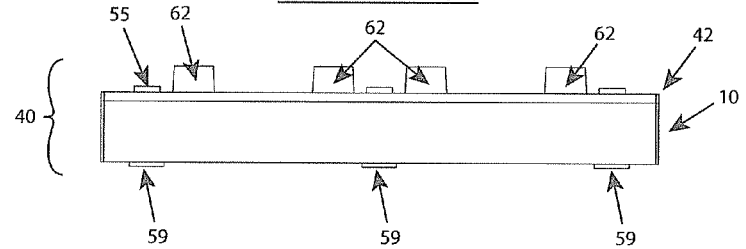
Figure 20:
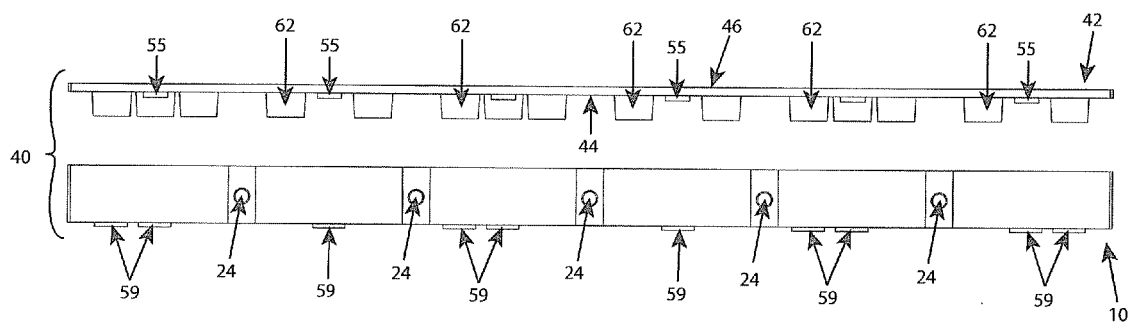
FIG. 20(a) is a partially exploded side elevational view showing assembly of the module and cover of FIG. 13(a) where the second side of the cover faces upwardly.
FIG. 20(b) is a fully assembled, side elevational of the module and cover of FIG. 20(a).
FIG. 20(c) is a partially exploded, end elevational view showing assembly of the module and cover of FIG. 20(a).
FIG. 20(d) is a fully assembled, end elevational of the module and cover of FIG. 20(d).
FIG. 20(e) is a side view showing a male connector on the cover being received in a female sleeve on the module.
Figure 20:
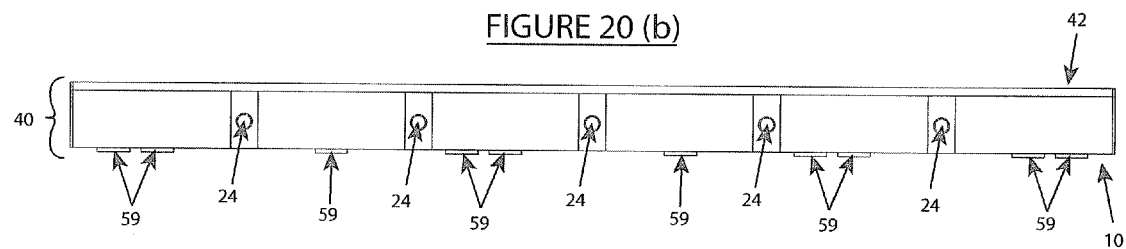
Figure 20:
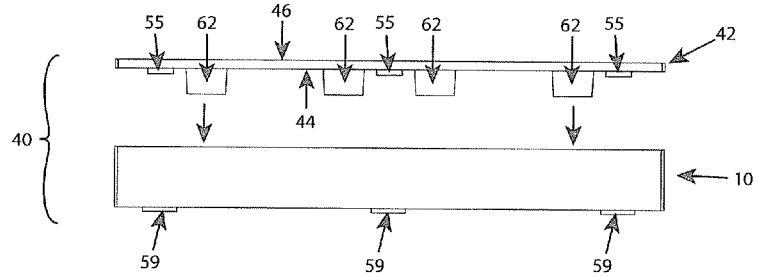
Figure 20:
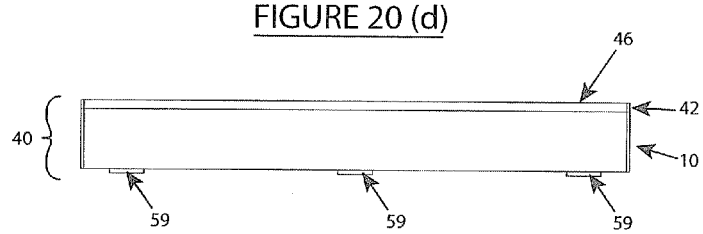
Figure 20:
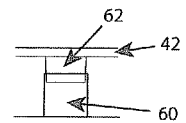

FIGS. 15(*a*)-(*h*) more particularly illustrate in sequential steps how a plurality of connectors 64 may be used to couple three longitudinally aligned construction assemblies 40 together to form a multi-component construction panel 72. FIGS. 16(*a*)-(*h*) similarly illustrate how connectors 64 may be used to couple six longitudinally and transversely aligned construction assemblies 40 together to form a panel 72 having a larger surface area. The width and length of panel 72 may thus be easily customized to suit the particular application of interest.

As described above, modules 10 include conduits 24 extending transversely therethrough at spaced intervals. Instead of, or in addition to, acting as a guide for cable connectors 26, conduits 24 may form part of a fluid circulation system for moving fluids in a flow path through the interior of each module 10. For example, as shown schematically in FIG. 25(*a*), in one embodiment of the invention a heat-regulating or heat exchanging fluid may be circulated through conduits 24 or tubing 80 deployed within conduits 24. As used in this patent application, the term "fluids" includes both liquids and gases. For example, the fluid may be water heated by a boiler 82 in fluid communication with tubing 80. In another embodiment of the invention, the fluid may be anti-freeze. In yet another embodiment, gases could be circulated within conduits 24, such as heated air. Boiler 82 may include a fluid pump or, alternatively, a pump may be installed at another location in the flow path. As is well known in the prior art, the fluid pump may include a timer or other controller to operate only during selected intervals rather than continuously.

Figure 25:
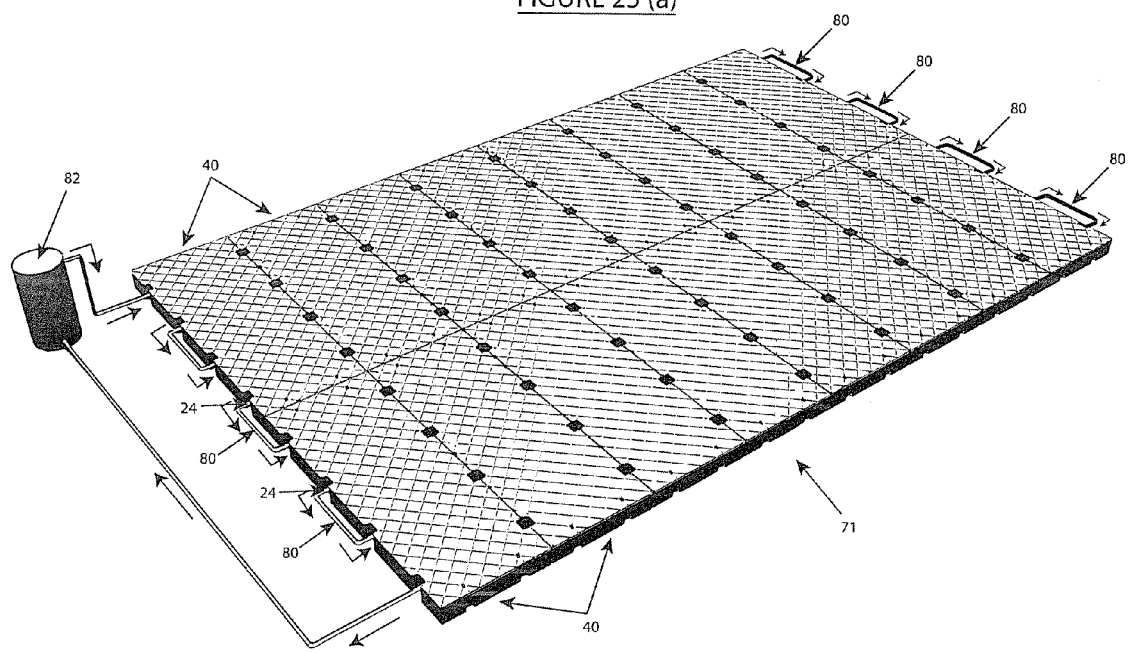
FIG. 25(a) is a top perspective view of a fluid circulation system comprising a construction panel assembled in accordance with the invention.
FIGS. 25(b) and 25(c) are top perspective views of the fluid circulation system of FIG. 25(a) in use as a heated floor.
Figure 25B:
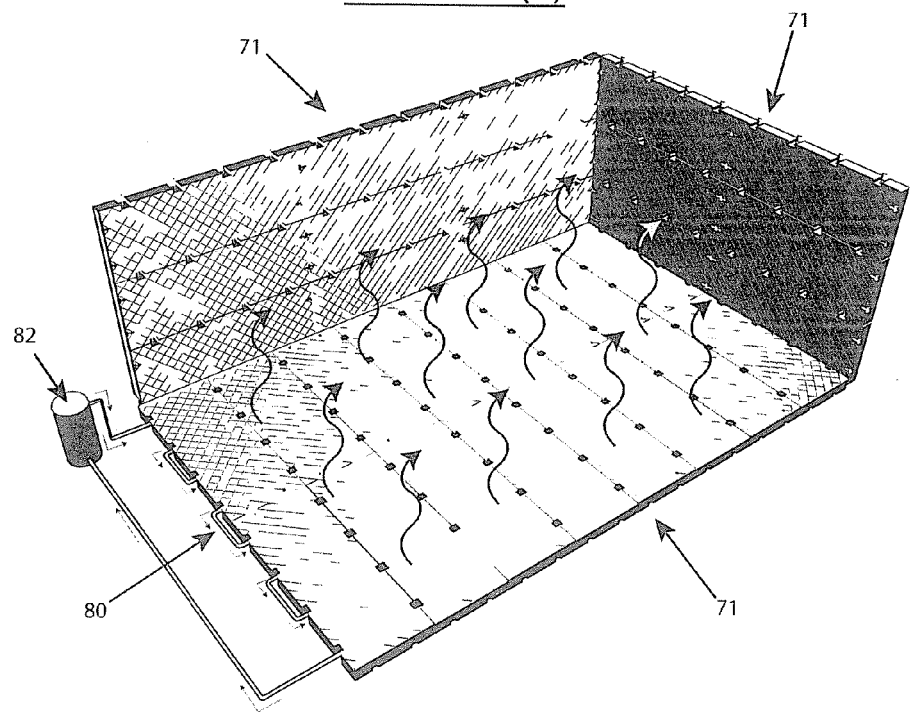
Figure 25C:
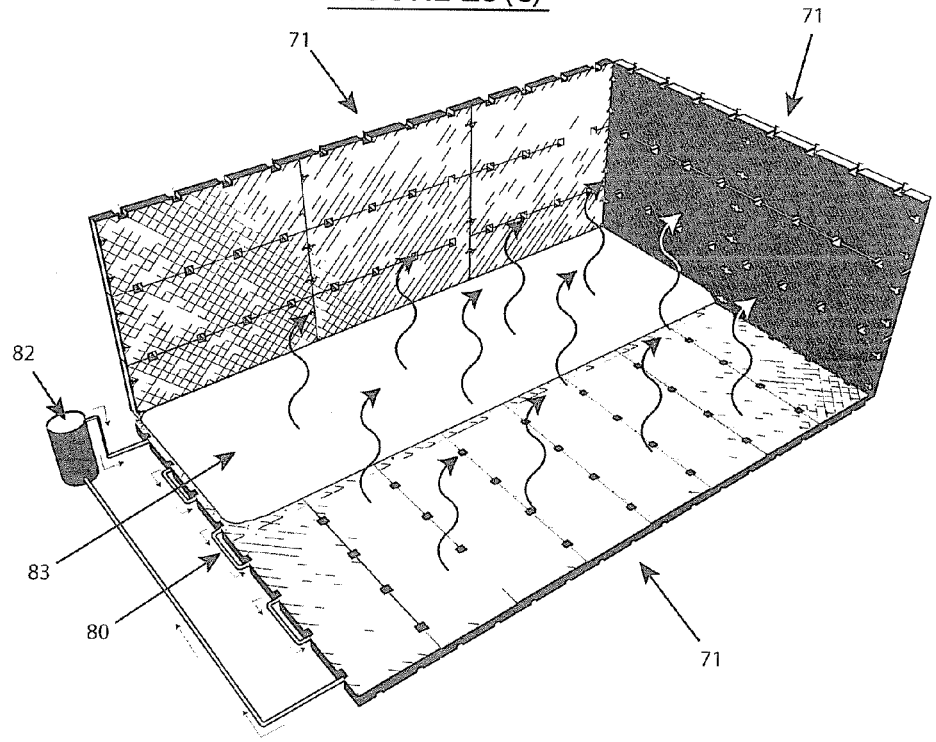
Figure 26A:
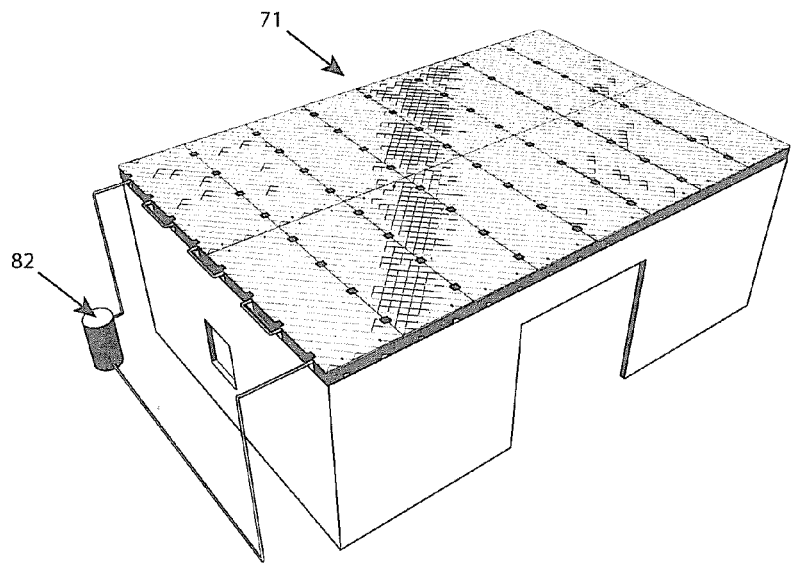
FIGS. 26(a)-26(c) are top perspective view of the fluid circulation system of FIG. 25(a) in use as a heated roof.
Figure 26B:
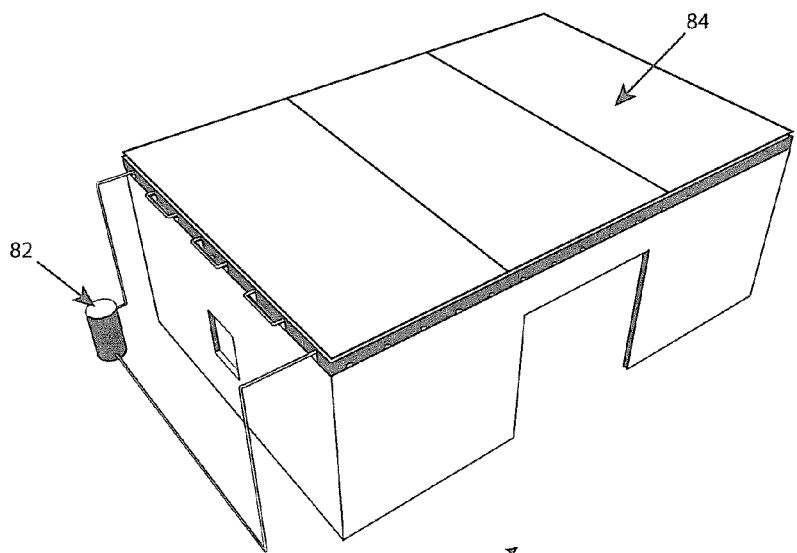
Figure 26C:
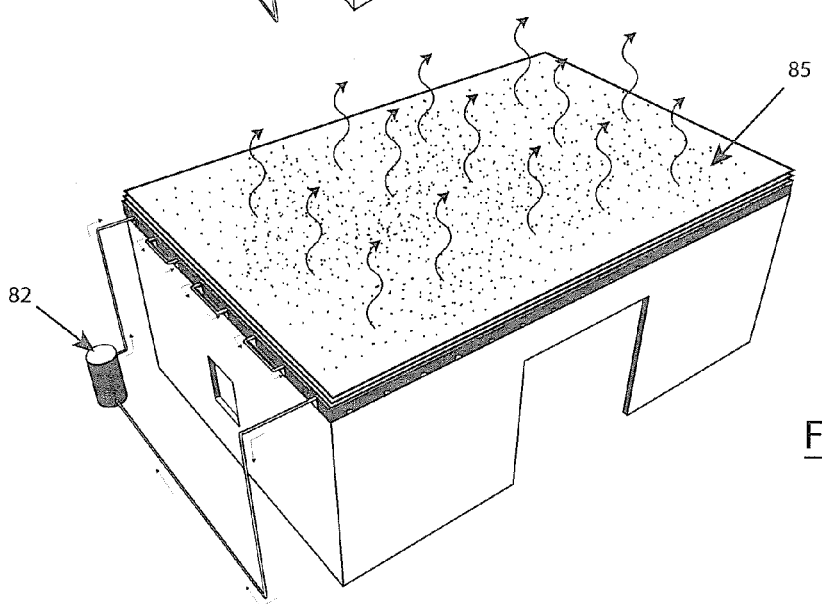

By way of further example, assemblies 40 may be connected to form construction panels 71 or 72 suitable for use as heated flooring, roofing or wall panels. FIGS. 25(*b*) and 25(*c*) illustrate use of the fluid circulation system of FIG. 25(*a*) as a heated floor. FIGS. 26(*a*)-26(*c*) illustrate use of the fluid circulation system of FIG. 25(*a*) as a heated roof. For example, heated flooring, walls or roofing comprising construction panels 71,72 could be used in barns, stables, greenhouses, storage sheds or other temporary structures where it is important to control indoor temperature or avoid snowfall or ice accumulation. As shown in the drawings other materials 83 could be placed over panels 71, 72 such as dirt, mulch, bedding, rubber matting, styrofoam or other roofing materials 84, 85 depending upon the particular application.

By way of another potential application, panels 71 or 72 could be temporarily installed in outdoor parking lots, driveways, roadways and the like to melt snow during winter months in northern climates. This would remove the need for frequent plowing or salting. As indicated above and shown in FIGS. 26(*a*)-26(*c*), panels 71,72 could similarly used on roofing to reduce or prevent snow accumulation. The panels 71,72 could be configured so that they are heated only during particular climatic conditions or during particular times of day. At the end of the winter season the panels 71,72 could be quickly and easily disassembled and removed if desired.

Depending upon the application and range of operating temperatures, the distance between conduits 24 could be adjusted. For example, in very cold conditions the number of conduits 24 carrying heated water could be increased to reduce the distance between adjacent conduits and ensure that the entire panel 71, 72 is evenly heated. As will be appreciated by a person skilled in the art, in alternative embodiments of the invention the flow path of conduits 24 could also be varied (e.g. by using non-linear flow paths) to achieve substantially even heating or to suit particular applications.

As described above, another possible application for construction panels 71, 72 is in the construction of temporary roadways on unstable ground, such as arctic tundra or wetlands. Since panels 72, which include interdigitated connectors 64, have a greater thickness and structural rigidity than panels 71, they are particularly suited to applications where it is necessary to support a high level of compressed weight, such as heavy vehicles or machinery. By way of example, in one embodiment of the invention modules 10 are 6 inches in thickness; cover 42 is one inch in thickness; and connectors 64 are 4 inches in thickness. Accordingly, the overall thickness of construction panel 72 in this example is 11 inches.

As described above modules 10 and covers 42 may be formed from plastic. Connectors 64 may be similarly formed from plastic. Thus both construction panels 71 and 72 may be formed, or substantially formed, from very light-weight components manufactured from plastic molds in a mass production process. This enables convenient assembly or disassembly of panels 71, 72 at the construction site without the need for cranes or other heavy lifting machinery. By way of example, in one embodiment of the invention each module 10 could be approximately 3 or 4 feet in width and 8 feet in length and weigh on the order of 70-80 pounds if constructed from extruded plastic. Accordingly, each module 10, as well as cover 42 and connectors 64, could be lifted and carried by a single person for ease of installation. In some cases assemblies 40, i.e. each comprising a module 10 and cover 42, could be preassembled at a factory before delivery to a construction site.

Figure 27:
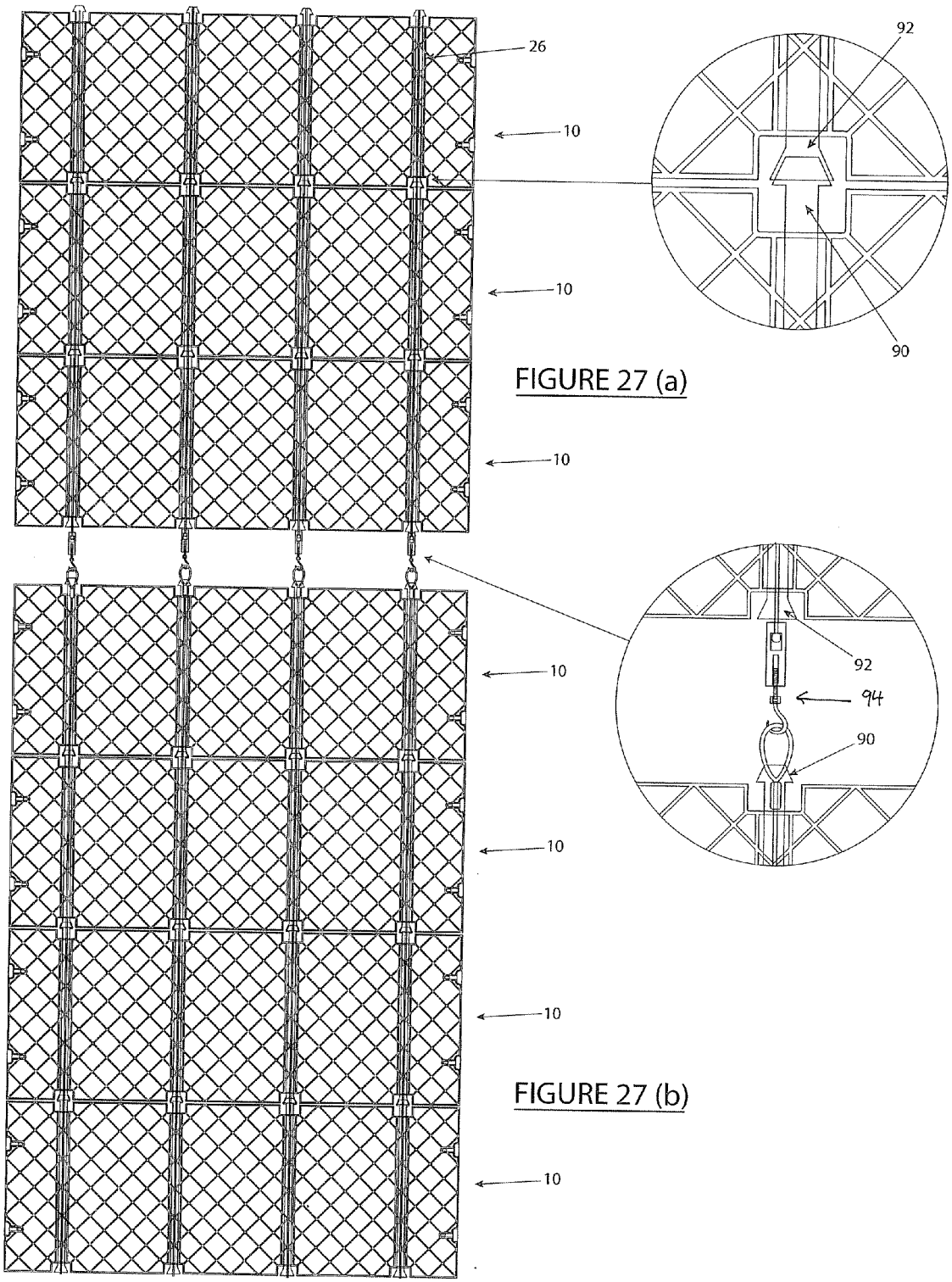
FIG. 27(a) is an enlarged top plan view of a connector for coupling end portions of connecting cables together.
FIG. 27(b) is an enlarged top plan view of a modified cable connector.

FIGS. 27(*a*) and 27(*b*) illustrate a further embodiment of the invention for adjustably coupling end portions of cable connectors 26 together and for maintaining cable tension. In this embodiment conduit 24 may include interlocking male and female end portions 90, 92 for coupling modules 10 together. Further, an adjustable turnbuckle 94 may be provided for adjusting the tension of cable 26 at the junction between adjacent modules. This feature is particularly useful where construction panels 71, 72 are deployed over long stretches and/or undulating terrain. As discussed above, both module 10 and cover 42 may includes cut-outs 28, 65 for allowing access to end portions of cable connectors 26. Optionally, removable inserts (not shown) may be fitted within the cut-outs 28, 65 when access to cable 26 is not required. Many other equivalent means for releasably coupling adjacent modules 10 together and for accessing and adjusting the tension of cables 26 may be envisioned by a person skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An assembly comprising:
   (a) a construction module comprising a deck and a plurality of wall elements projecting from said deck, wherein said wall elements define a plurality of compartments, each of said compartments having a closed end defined by a portion of said deck and an open end remote from said deck; and
   (b) a cover for covering said module at said open end of each of said compartments, said cover having a first side and a second side, wherein said first side comprises a plurality of first projections extending therefrom and wherein said second side is substantially flat,
   wherein said cover is deployable on said module in either a first orientation wherein said first side faces inwardly toward said deck and said second side faces outwardly or a second orientation wherein said first side faces outwardly and said second side faces inwardly toward said deck, and wherein said module and said cover matingly engage in either of said first or second orientations.

2. The assembly as defined in claim 1, wherein said first projections are received in said compartments in said first orientation.

3. The assembly as defined in claim 2, wherein said module comprises sleeves located in at least some of said compartments for receiving said first projections in said first orientation.

4. The assembly as defined in claim 1, wherein said module comprises second projections and wherein said cover comprises apertures for receiving said second projections in said first and said second orientations.

5. The assembly as defined in claim 4, wherein said assembly comprises fasteners, each of said fasteners being insertable into a corresponding one of said second projections for releasably coupling said module and said cover together.

6. The assembly as defined in claim 5, wherein said fasteners are bolts and wherein said module comprises a plurality of nuts secured to said deck for threadingly receiving said bolts.

7. The assembly as defined in claim 1, wherein said cover comprises a plurality of ribs projecting from said second side thereof.

8. The assembly as defined in claim 1, comprising at least one connector separate from said module for matingly engaging said first projections in said second orientation.

9. The assembly as defined in claim 8, comprising a plurality of connectors for engaging said first projections in said second orientation.

10. The assembly as defined in claim 9, wherein said connectors together define an outer support surface extending in a plane generally parallel to said deck.

11. The assembly as defined in claim 10, wherein said support surface comprises a plurality of ribs projecting therefrom.

12. The assembly as defined in claim 9, wherein said module comprising second projections and wherein said cover comprises cover apertures for receiving said second projections in said first and said second orientations, and wherein said connectors comprise connector apertures alignable with said cover apertures, said assembly further comprising fasteners each insertable through one of said connector apertures and one of said cover apertures into a corresponding one of said second projections to hold said assembly together.

13. The assembly as defined in claim 1, wherein said module comprises a plurality of first connecting elements and said cover comprises a plurality of second connecting elements for matingly engaging said first connecting elements.

14. The assembly as defined in claim 1, wherein said module comprises a plurality of spaced-apart conduits extending transversely therethrough.

15. A multi-module construction panel comprising:
   (a) a plurality of assemblies, each comprising a module and a cover as defined in claim 1; and
   (b) at least one connector for releasably coupling said assemblies together, wherein said connector comprises a connector panel separate from said assemblies for extending over at least part of said cover, said panel comprising a plurality of female sleeves formed on an undersurface thereof for receiving said first projections when said cover is in said second orientation and comprising a substantially planar deck surface on an upper surface thereof.

16. The construction panel as defined in claim 15, wherein each of said modules comprises a plurality of conduits extending transversely at spaced-intervals.

17. The construction panel as defined in claim 16, wherein said modules are arranged so that said conduits are aligned and wherein said at least one connector comprises a cable threaded through said aligned conduits.

18. The construction panel as defined in claim 15, wherein at least some of said connectors extend between different assemblies.

19. The construction panel as defined in claim 18, wherein said upper surface of said connector panels together define an outer support surface extending in a plane generally parallel to each of said modules.

20. The construction panel as defined in claim 15, wherein each of said modules comprises a plurality of conduits extending transversely at spaced-intervals and wherein said panel comprises a fluid circulation systems for circulating fluid in a flow path through said conduits.

21. The construction panel as defined in claim 20, wherein said fluid is contained within tubing positioned within said conduits.

22. The construction panel as defined in claim 21, wherein said fluid regulates the temperature of said panel.

23. The construction panel as defined in claim 22, wherein said fluid is heated water.

24. The construction panel as defined in claim 22, wherein said fluid is gaseous.

25. The use of a construction panel as defined in claim 22 for a construction application selected from the group consisting of flooring, roofing and a temporary support for vehicles or equipment.

26. The assembly as defined in claim 1, wherein said cover extends above said module when said cover and module are coupled together in either of said first or second orientations.

* * * * *